United States Patent [19]

Kusunoki

[11] Patent Number: 5,787,257
[45] Date of Patent: Jul. 28, 1998

[54] CONTROL METHOD FOR STATION-TO-STATION SLAVE TRANSMISSION

[75] Inventor: Masashi Kusunoki, Kawasaki, Japan

[73] Assignee: Fujitsu Limited, Kanagawa, Japan

[21] Appl. No.: 972,701

[22] Filed: Nov. 18, 1997

Related U.S. Application Data

[63] Continuation of Ser. No. 594,695, Jan. 31, 1996, abandoned.

[30] Foreign Application Priority Data

Mar. 17, 1995 [JP] Japan .................................. 7-059401

[51] Int. Cl.⁶ .................................................... G06F 13/00
[52] U.S. Cl. .................... 395/200.72; 379/211; 379/259
[58] Field of Search ............................... 379/211, 259; 395/200.72

[56] References Cited

U.S. PATENT DOCUMENTS

| | | | |
|---|---|---|---|
| 5,555,017 | 9/1996 | Landante et al. | 348/15 |
| 5,610,918 | 3/1997 | Kamo et al. | 370/395 |
| 5,621,731 | 4/1997 | Dale et al. | 370/257 |

Primary Examiner—Krisna Lim
Attorney, Agent, or Firm—Helfgott & Karas P.C.

[57] ABSTRACT

With regard to a method of controlling station-to-station transmission in a network formed by exchanges which support ISDN, and particularly for the purpose of implementing, during communication between stations via one medium, slave transmission with respect to the same party using a different medium, without consideration of the number of the party, when an exchange which receives a request for slave transmission from a terminal in communication via one medium with an already-communicating terminal of another station detects this request, a slave transmission identifier and the call reference used to connect to the already-communicating terminal are detected, the slave transmission identifier and call reference are set into the information elements to be added to a call setting message, a different channel in the same interface which is used to connect to the already-communicating terminal is captured, this being used to transmit to the other station. This other station detects, by means of the information elements added to the received call setting message, that this is a slave transmission, receiving being done at the other party terminal via a medium of a type specified based on call reference.

23 Claims, 27 Drawing Sheets

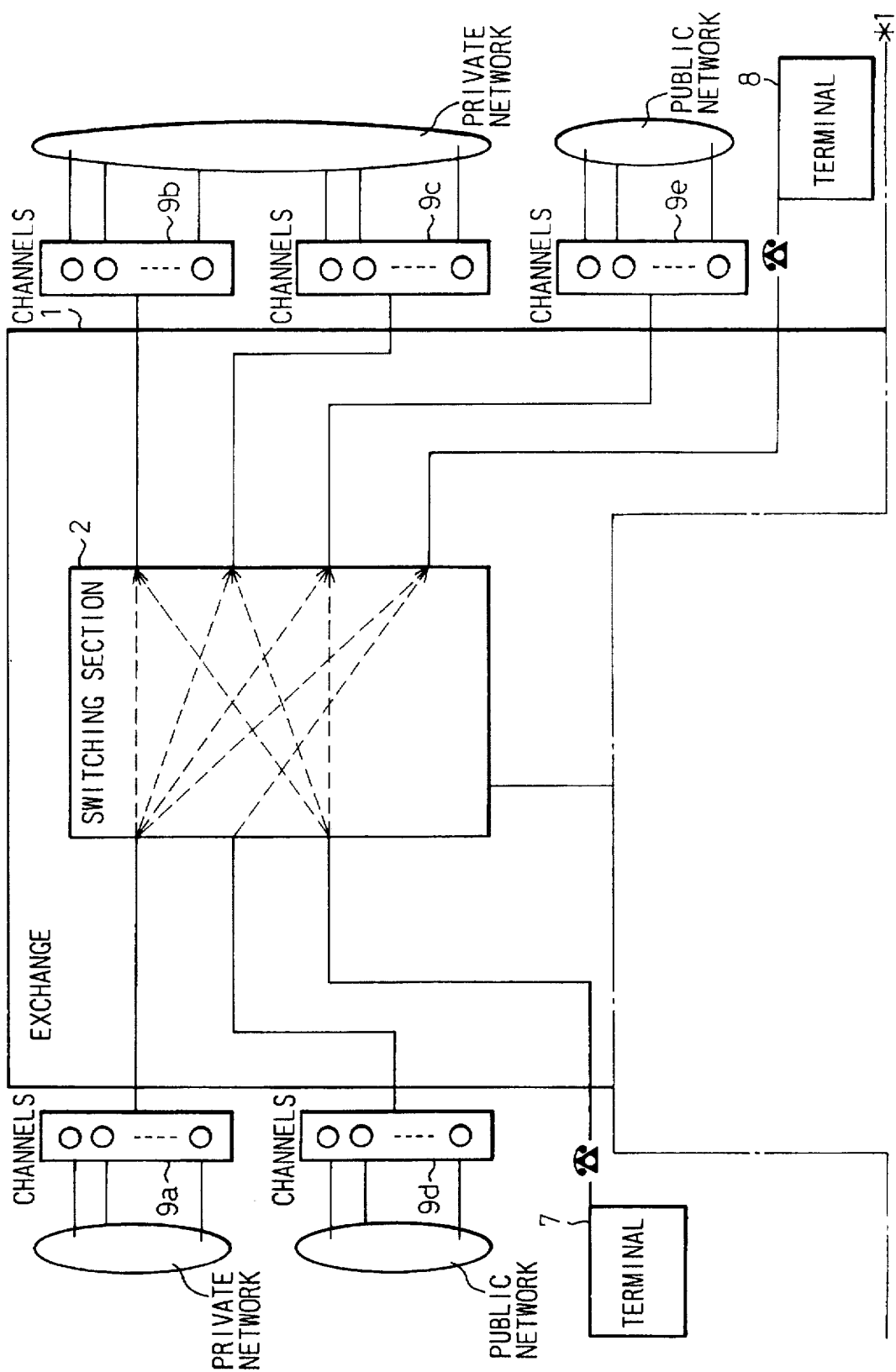

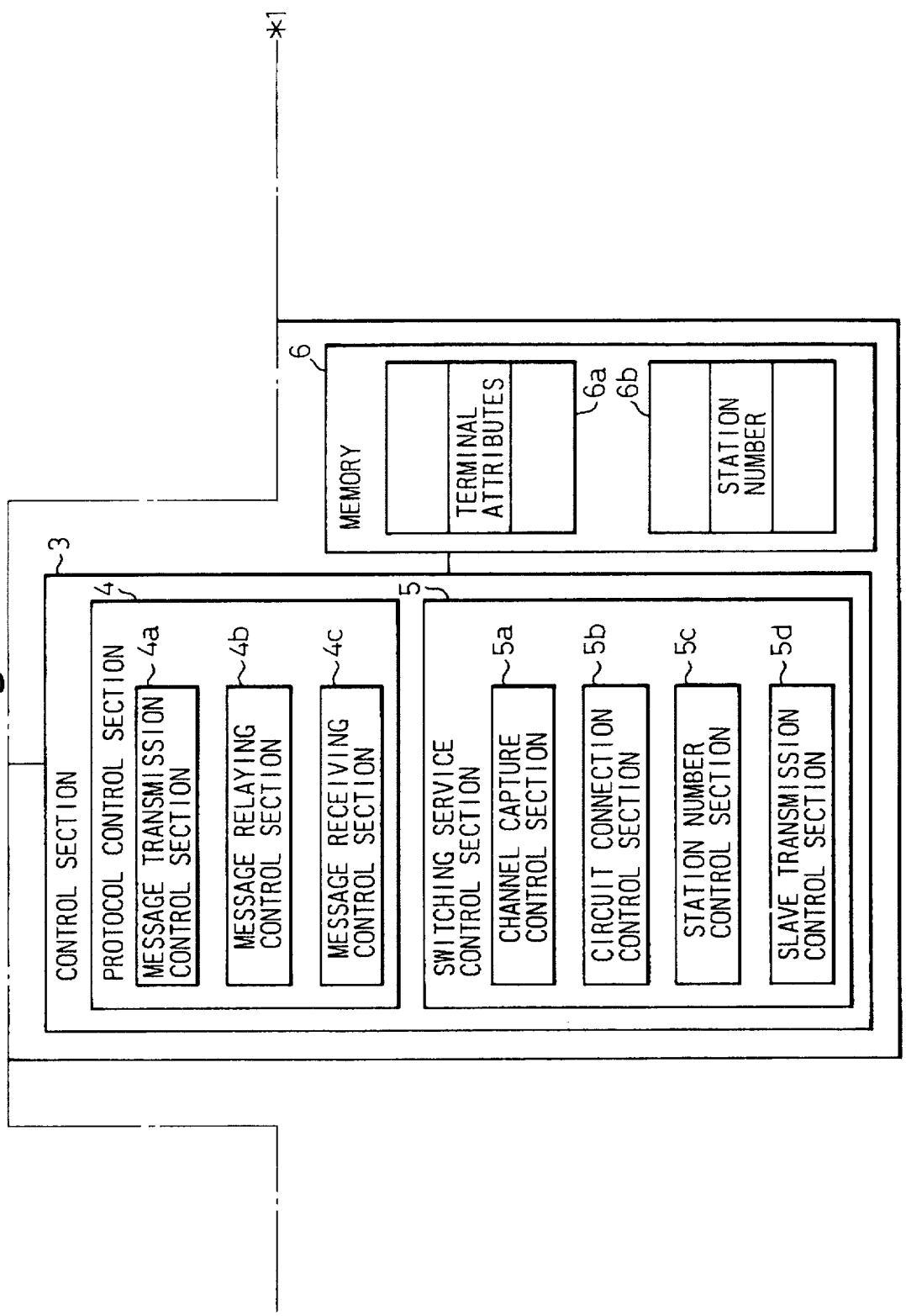

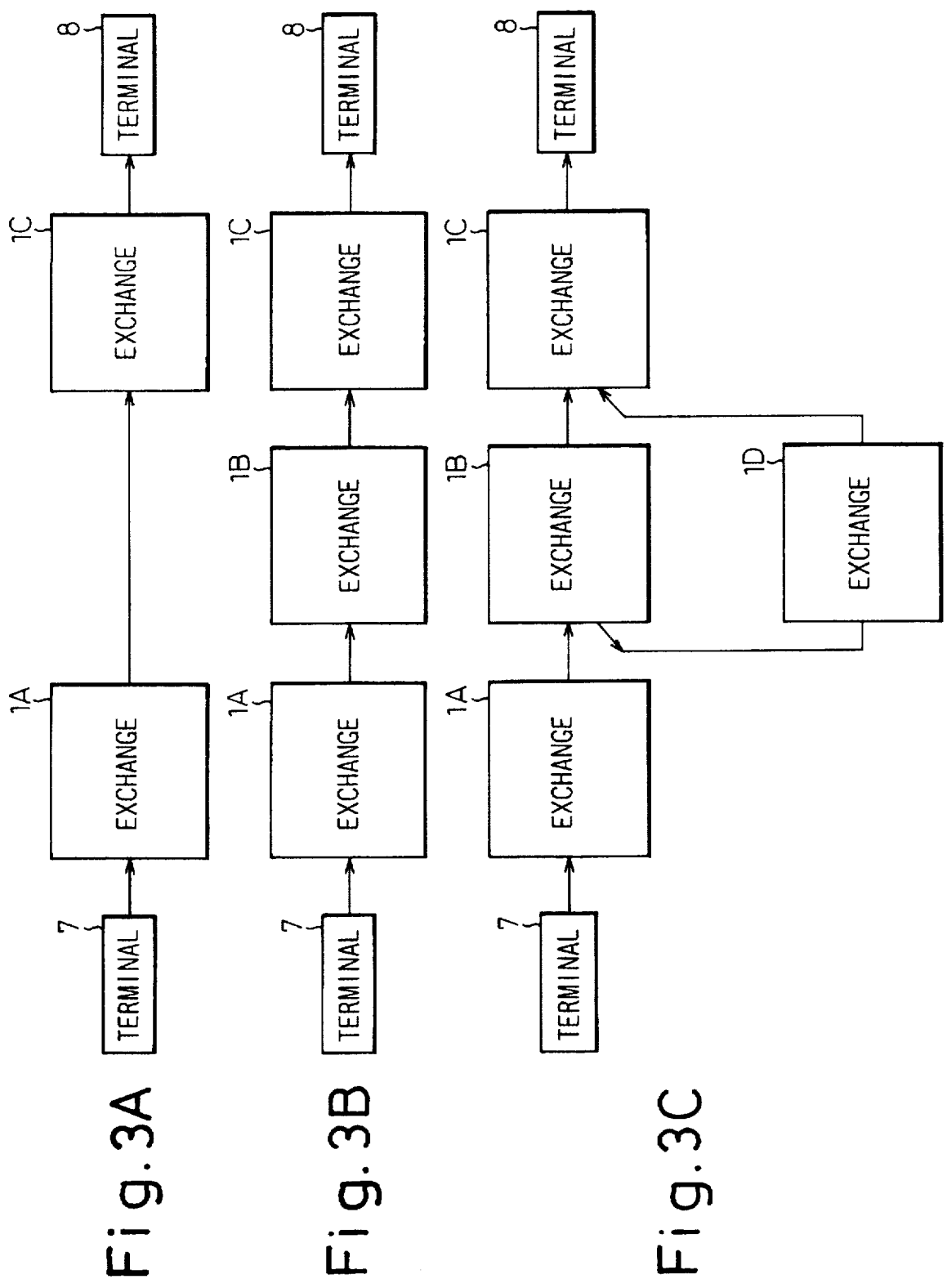

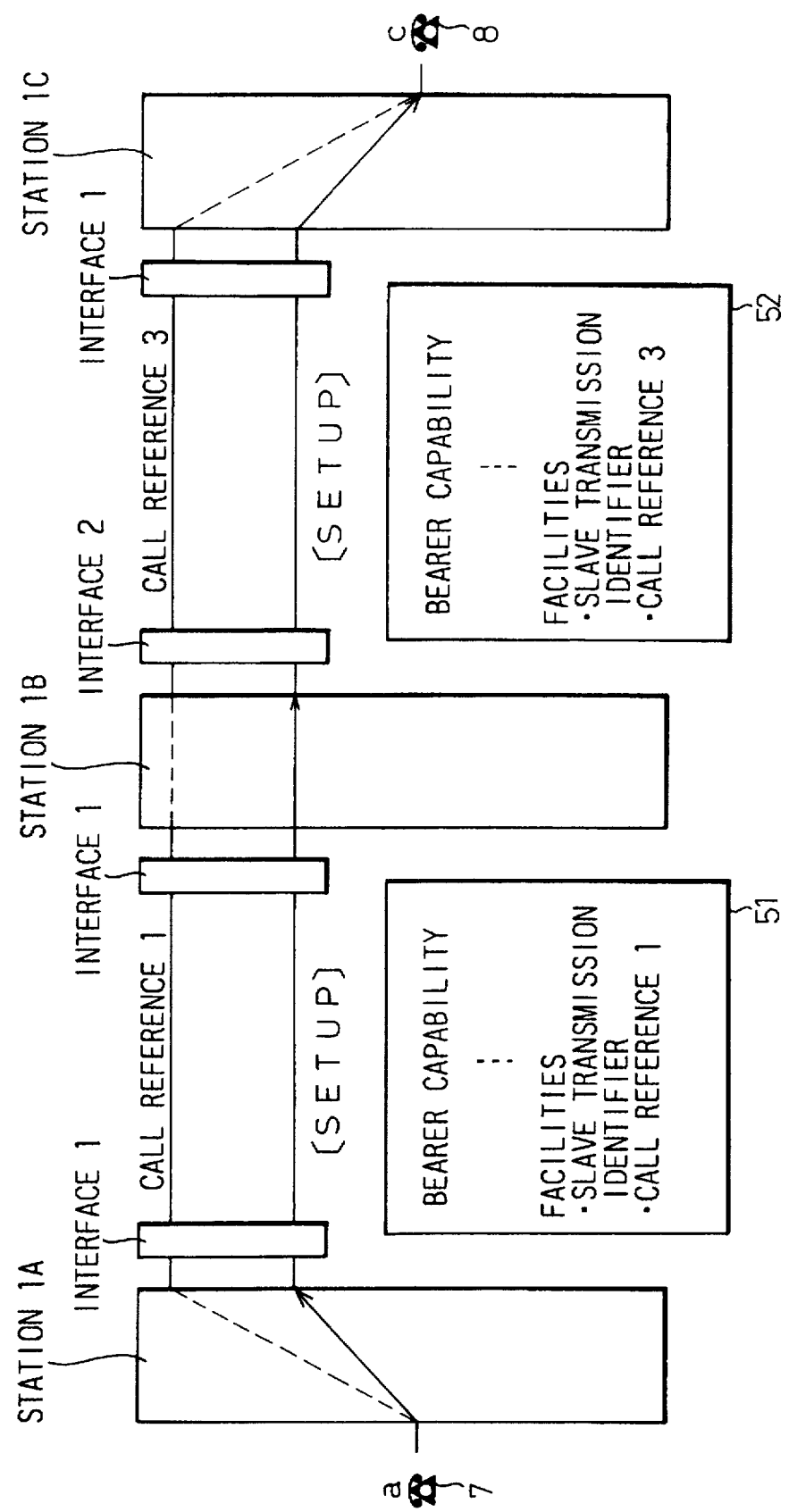

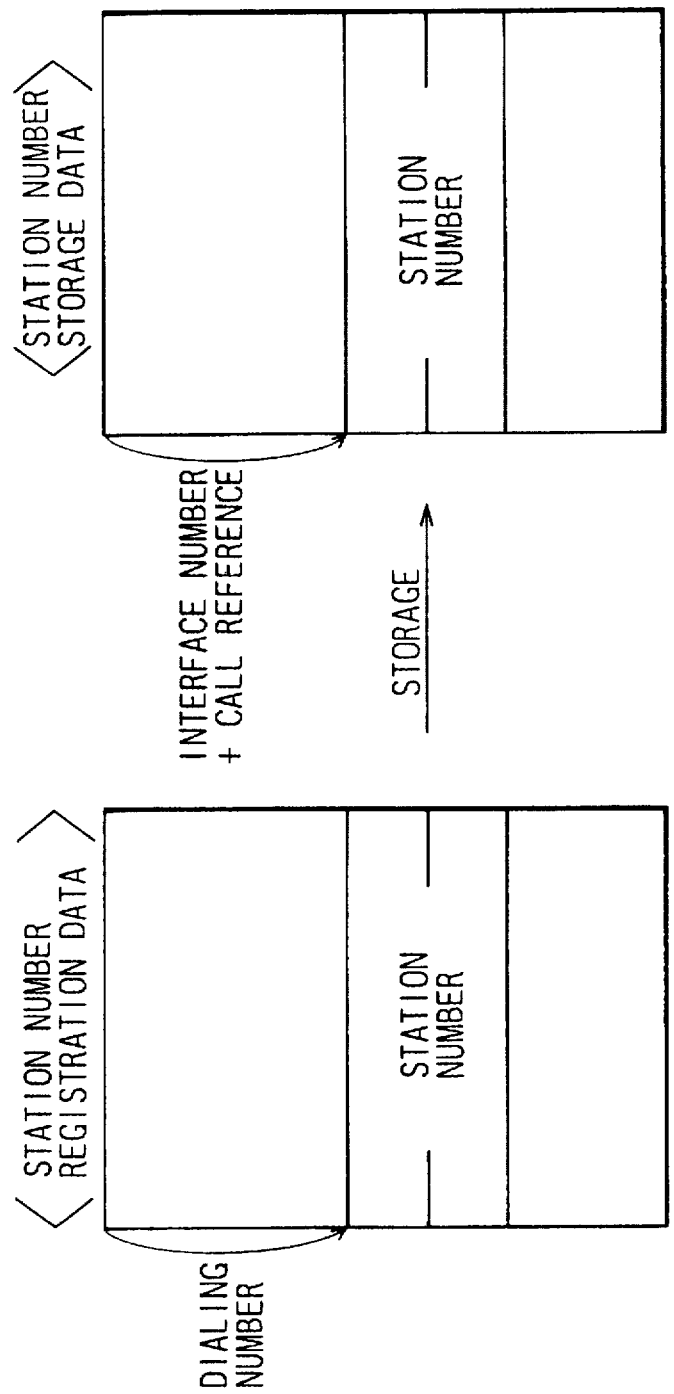

CONTROL METHOD FOR STATION-TO-STATION SLAVE TRANSMISSION

This is a continuation of application Ser. No. 08/594,695, filed Jan. 31, 1996, now abandoned.

BACKGROUND OF THE INVENTION

1. Field of the Invention

The present invention relates to a method of controlling slave transmission between stations for the purpose of executing transmissions between stations in a network made up of ISDN-type exchanges.

In recent years, with advances in exchange services in information networks, there has arisen a strong demand for the appearance of an exchange service with a variety of terminal attributes, such as voice, data, and images. In providing such a service, it is desirable that, when communication is being performed by means of one terminal attribute, slave transmission be implemented between stations so that communication is performed with the same station by means of a different terminal attribute.

2. Description of the Related Art

In the prior art, first two circuits which are connected to an exchange (non-ISDN type) are connected to a telephone terminal and a video terminal which are located in the same position, the two circuits being registered as a paired circuit at the above-noted exchange. In this configuration, when the user of a telephone terminal of a given circuit is performing voice communication with a telephone terminal of a circuit of another user of the exchange, if the user wishes to perform transmission and reception of video signals with the same other party using the video terminal which forms a pair with the telephone terminal, an operation is performed (pressing a function button) from the above-noted telephone terminal which requests slave transmission. By doing this, a dialing signal of a special service number which corresponds to a request for slave transmission is sent to the exchange.

When the exchange detects this special service number dialing signal, it recognizes this as slave transmission, and makes connection between the video terminals which are paired to each of the telephone terminals between which receiving and transmission is to be performed. By doing this, it is possible to execute communication between the above-noted video terminals, in parallel with the communication between the above-noted telephone terminals.

In an exchange in the prior art, such as described above, it was possible to implement slave transmission between telephone terminals connected to the same exchange (same station), using two circuits (a pair circuit). However, in the case in which the two telephone terminals which are to communicate are connected to different exchanges, a connection is made by means of a relay circuit between the stations. In this case, the following problem occurs.

If, for example, a call is received by a telephone terminal on the exchange at the other end, there are cases, such as when nobody is there, in which a call receiving and forwarding function operates so as to automatically make connection to a circuit of a terminal other than the terminal of the specified circuit. When this is done, in the case in which the telephone terminal at the forwarding destination does not have a paired video terminal, a problem exists in that, even if the user of the telephone terminal operates a function key to perform slave transmission, the circuit will not be connected, rendering the slave transmission function inoperative.

Although with ISDN, which has gained in usage in recent years, it is possible to conduct communication on a plurality of channels (for example, with a basic interface of 2B+D), the ISDN of the past did not provide an implementation of slave transmission, so that the same problem would arise in the case of performing slave transmission across a connection between stations as described above with regard to non-ISDN type exchanges.

SUMMARY OF THE INVENTION

In consideration of the above-described problem in the prior art, an object of the present invention is to provide a method of controlling slave transmissions which enables implementation of a slave transmission which, during communication between ISDN exchanges via one medium, makes connection between the same parties via yet another medium, without using the number of the other party.

Another object of the present invention is to provide a method of controlling slave transmissions which, in the case in which, during execution of slave transmission, all the channels of a given interface connected to the far-end party are in use, is capable of using a different interface to make an alternate circuit routing.

In accordance with the present invention, in a network configured with exchanges that support ISDN, when an exchange, which receives a slave transmission request from its own communication terminal which is performing communication via one medium with a terminal of a different station, detects the above-noted slave transmission request from the above-noted terminal, it detects the call reference being used in the connection to the above-noted other station, an identifier and a call reference are set into information elements which transfer control information of an ISDN protocol message, and control is performed so that a different channel of the same interface that connects to the terminal of the above-noted station is captured, and a call setting message to which are added the above-noted information elements is sent to the above-noted station.

A control method is provided whereby the above-noted exchange of the other station detects, from the information elements added to the above-noted received call setting message, that this is a slave transmission, and control is performed so that the call is received at the other terminal via the specified type of medium, based on the call reference included in the above-noted information elements.

Additionally, in accordance with the present invention, when an exchange that receives the above-noted slave transmission request, or an exchange which performs relaying between the above-noted exchange and an exchange which houses a terminal already in communication with a different station detects, by the reception of the above-noted call setting message, that there is a slave transmission request, information elements which were added to the above-noted call setting message are set into a transmission call setting message, the above-noted call reference of the information elements are changed to the call reference which is in a relationship of connection to the call reference of the received information elements, and the control is performed so that a call setting message is sent to the above-noted exchange having the already-communicating terminal, via a different free channel in the same interface as one used in connection to the above-noted already-communicating terminal.

In addition, according to the present invention, in the case in which, when a call setting message is sent to the already-communicating terminal of a different station, if there is no different, free channel in the same interface as the one used in connection to the above-noted already-communicating terminal, a request is made to the exchange of the above-noted already-communicating terminal for the extraction of the number of the interface used to connect to the already-communicating terminal and the call reference for the purpose of make a connection by an alternate route, and when notification of the above-noted interface number and call reference is made, a call setting message to which are added information elements which include the interface number, call reference, and an alternate route slave transmission identifier is generated and sent to a different exchange, in the alternate route.

The above-noted different exchange on the alternate route captures an alternate channel by means of the information elements of the above-noted call setting message and sends the above-noted call setting message to the above-noted exchange of the already-communicating terminal, and when this exchange of the already-communicating terminal detects the above-noted alternate route slave transmission identifier, control is performed so that the call is received at the other party based on the interface number and call reference included in the information elements.

When not only all the channels of a given interface making connection to the above-noted already-communicating terminal are in use but also either there is no station number or all alternate channels are in use, a disconnect message to which is added information elements which include a slave transmission identifier and the call reference within the information elements added to the received call setting message is generated and sent to the immediately previous station.

When the immediately previous exchange receives the above-noted disconnect message, it detects slave transmission, by means of the above-noted information elements, and when there is a station number corresponding to the call reference set in these information elements, an alternate route connection is made via a different exchange by means of this station number. If either there is no station number or all alternate channels are in use, the call reference of the above-noted received disconnect message is updated and sent to a further immediately previous station.

In the case in which both all the channels of a given interface which connects to an already-communicating terminal and all junction channels for the purpose of an alternate route are in use, a request is made to the exchange of the already-communicating terminal, for extraction of the number of the interface used to connect to the already-communicating terminal and the call reference. When notification is made from the above-noted exchange of the already-communicating terminal of the above-noted interface number and call reference, information which includes this interface number, call reference, and an alternate route slave transmission identifier is added to a call setting message as user-user information elements, this being sent to the station circuit network. Then, when the above-noted exchange of the already-communicating terminal receives the above-noted call setting message from the station circuit, it causes the call to be received by the already-communicating terminal, via a station circuit, using the information of the user-user information elements.

In the case in which a connection is made via the above-noted alternate route, a request to the exchange of the already-communicating terminal to extract the number of the interface and the call reference used to connect to the already-communicating terminal is sent by means of an ISDN protocol FACILITY message, via a D channel which is used in the previously started communication, and when the exchange of the already-communicating terminal extracts the number of the interface and the call reference used to connect to the already-communicating terminal, notification is made by means of an ISDN protocol FACILITY_ACK message.

When a call is received by the above-noted already-communicating terminal, the exchange of the already-communicating terminal searches in its memory for terminal information connected to the call reference included in the information elements of the received call setting message, so that the call is received after changing the above-noted terminal information in the medium attributes which is a transfer capacity element associated with the call setting message.

BRIEF DESCRIPTION OF THE DRAWINGS

The present invention will be more clearly understood from the description as set forth below, with reference being made to the accompanying drawings, wherein:

FIGS. 2A and 2B are basic configurations drawing of an exchange which is used in slave transmission according to the present invention;

FIG. 3A is a drawing which shows the first connection aspect of slave transmission according to the present invention;

FIG. 3B is a drawing which shows the second connection aspect of slave transmission according to the present invention;

FIG. 3C is a drawing which shows the third connection aspect of slave transmission according to the present invention;

FIG. 4 is a drawing which shows an embodiment of second connection aspect which is shown in FIG. 3;

FIG. 13 is a drawing which shows an example of using a station number storage area;

DESCRIPTION OF THE PREFERRED EMBODIMENT

Before describing the present invention, art related to the present invention will be described.

Figure 1:
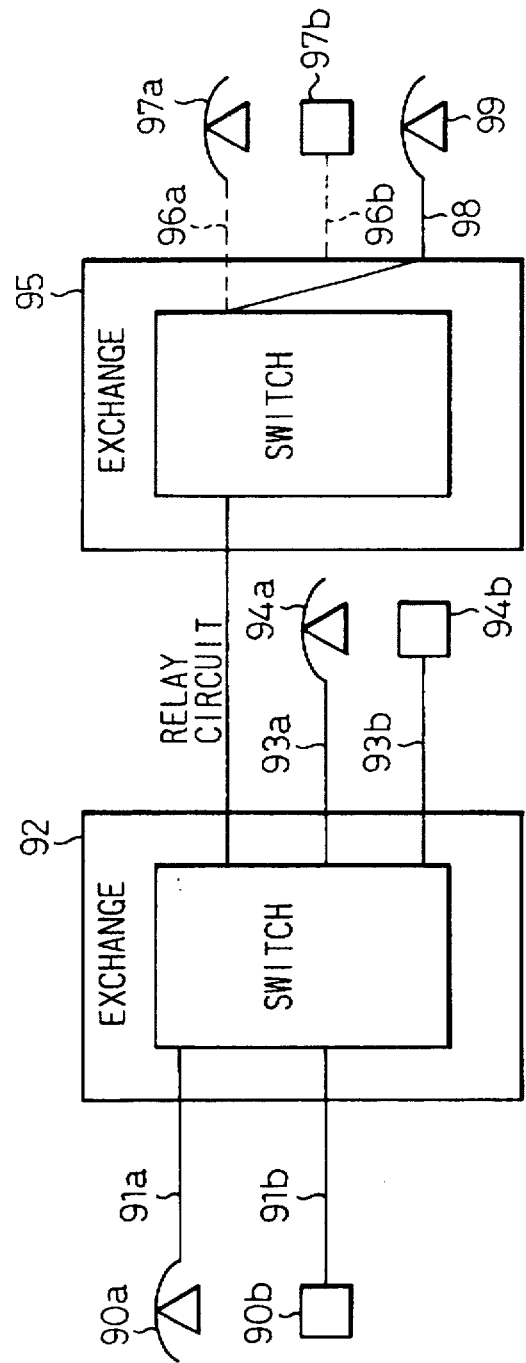
FIG. 1 is a drawing which is used to illustrate the related art with regard to the present invention.

FIG. 1 is a drawing which will be used to describe the related art.

In FIG. 1, two circuits 91a and 91b, which are connected to an exchange 92 (non-ISDN type) are connected respectively to a telephone terminal 90a and a video terminal 90b, these two circuits 91a and 91b being registered in the exchange as a pair circuit. In this configuration, when the user of the telephone terminal 90a of the circuit 91a is performing voice communication by voice in connection with the telephone terminal 94a of the circuit 93a of a different user of the same exchange 92, if the user wishes to perform transmission and reception of video signals with the same other party using the video terminal 90b, an operation is executed (pressing a function button) from the above-noted telephone terminal which requests "slave transmission," whereby a dialing signal of a special service number which corresponds to a request for slave transmission is sent from the above-noted telephone terminal 90a.

When the exchange 92 detects this special service number dialing signal, it recognizes this as slave transmission, and uses the information (telephone number) of the currently held circuit 93a, which is the connection destination of the circuit 90a, which is currently performing communication, to detect the circuit 93b, which forms a pair with the circuit 93a. Next, the circuit 91b, which forms a pair with the circuit 91a that performed slave transmission, is connected to the video terminal 94b of the circuit 93b, which is paired with the circuit 93a. When the video terminals 90b and 94b are connected, video communication is performed by video terminals 90b and 94b, in parallel with voice communication between telephone terminals 90a and 94a.

In an exchange such as this of the prior art, it was possible to implement slave transmission using two circuits (a pair circuit) between telephone terminals connected to the same exchange (same station). However, in the case in which the two telephone terminals which are to communicate are connected to different exchanges, a connection is made by means of a circuit between the stations. However, in this case, when making the first connection of voice circuits, there are cases in which connection is made to a terminal other than the terminal of the specified circuit. In FIG. 1, for example, when transmission is made from the telephone terminal 90a of the exchange 92 so as to call the telephone terminal 97a, which is connected to the exchange 95, even if the telephone terminal 97a is called, if there is nobody there, the connection will not be made. If this occurs, if the exchange 95 is providing forwarding service, forwarding will be done to a different telephone terminal 99, so that the call will be made between telephone terminal 90a and telephone terminal 99.

In this case, even if the user of the telephone terminal 90a presses a function key for the purpose of performing slave transmission, because the information of the telephone terminal 97a forwarding destination does not exist at the exchange 92, it is not possible to connect the forwarding video terminal 90b to the video terminal 97b, which is paired to the forwarding destination telephone terminal 97a.

In accordance with ISDN, which has increased in usage in recent years, while it is possible to conduct communication on a plurality of channels (for example, with a basic interface of 2B+D), the ISDN of the past did not provide an implementation of slave transmission, so that the same problem would arise in the case of performing slave transmission across a connection between stations as described above with regard to the case shown in FIG. 1 of non-ISDN type exchanges.

FIGS. 2A and 2B show the basic configuration of an exchange according to the present invention.

In FIGS. 2A and 2B, the reference numeral 1 denotes an exchange (or station) which supports ISDN, 2 is a switching section for the purpose of path setting and switching, and 3 is a control section which performs control of switching processing. In the above-noted control section 3, the reference numeral 4 denotes a protocol control section which performs communication message protocol control, and 5 is a switching service control section which executes various switching services. The above-noted protocol control section 4 includes a message transmission control section 4a, a message receiving control section 4c, and a message relaying control section 4b. The above-noted switching service control section 5 includes a channel capture control section 5a which controls capture of a communication channel, a circuit connection control section 5b which performs control of circuit connection by the above-noted switching section 2, a station number control section 5c which manages station number data, and a slave transmission control section 5d which performs slave transmission control.

The reference numeral 6 denotes a memory into which is stored exchange control information, this memory 6 including a terminal attribute storage area 6a into which are stored the attributes of installed terminals, and a station number storage area 6b into which are stored the station numbers of receiving stations corresponding to dialing numbers. The area 6b is indexed by an interface number and a call reference as explained hereafter. The reference numeral 7 denotes a terminal which performs slave transmission, and 8 is a remote terminal which is in communication with the above-noted terminal 7 by means of one medium. Reference numerals 9a through 9c denote each of the channels which are connected to the communication private network, 9a being a receiving channel, while 9b and 9c are transmitting channels. The reference numerals 9d and 9e are channels which are connected to station circuit network (connections to a communication network of another communication service provider), 9d being a receiving channel, and 9e being a transmitting channel.

FIGS. 3A through 3C show examples of aspects of connections between exchanges according to the present invention.

In FIGS. 3A through 3C, the reference numeral 1A denotes an exchange in which the terminal 7 is connected, 1C is an exchange in which the terminal 8 is installed, 1B is a repeater exchange, and 1D is an exchange which performs an alternate route connection. The internal configurations of exchanges 1A through 1D are the same as the exchange 1 of FIGS. 2A and 2B.

FIG. 3A shows the first connection aspect of the present invention, in which the terminals 7 and 8, which are installed, respectively, in exchanges 1A and 1C, are connected via the two exchanges. FIG. 3B shows the second connection aspect of the present invention, in which there is an additional relay exchange 1B between the above-noted exchanges 1A and 1C, and FIG. 3C shows the third connection aspect of the present invention, in which in addition to the configuration of FIG. 3B, there is an alternate route transit exchange 1D between the stations.

Next, the first and second connection aspects of the present invention will be described, with reference to FIG. 3A and FIG. 3B.

FIG. 3A shows the case in which exchanges to which are connected terminals which are conducting communication via one medium are connected via a junction circuit. When the terminal 7, which requests slave transmission, is connected to the exchange 1A and the other communicating terminal (hereinafter referred to as the already-communicating terminal) is connected to the exchange 1C, if slave transmission is requested from the terminal 7, a call setting message (SETUP) is issued from the exchange 1A to the ISDN terminal 7. When the slave transmission control section 5d of the exchange 1A detects the request for slave transmission, it starts the message transmission control section 4a. The message transmission control section 4a detects the call reference used in the connection with the already-communicating terminal 8, and edits the information elements (facilities) for added service which are provided by the network, which include the above-noted call reference and slave transmission indication (identifier), thereby forming a SETUP message added to the information accompanying the SETUP message (the common part, which includes the absolutely essential items such as the remote entity). The channel capture control section 5a captures a free channel (different B channel) from the same interface which is used in connection to the already-communicating terminal 8, the above-noted edited SETUP message being transmitted from the message transmission control section 4a via the D channel corresponding to this B channel.

At the exchange 1C, when the above-noted SETUP message, which is sent via the junction circuit, is received at the message receiving control section 4c and the slave transmission indicator of the added information elements is detected, the circuit connection control section 5c is started, the call reference and terminal 8 which is connected being identified from the above-noted added information elements. The call is received with respect to terminal 8 by means of the medium attribute (medium which differs from the communication already in progress), which is included in the SETUP message.

FIG. 3B shows the case in which the transmitting exchange 1A and the receiving exchange 1C are connected with a transit exchange 1B between them. First, a SETUP message to which is added appended information elements which include an indication of slave transmission is received by the transit exchange 1B via from the exchange 1A. When the above-noted transit exchange 1B detects, by means of the message receiving control section 4c, the fact that this is a slave transmission, the call references of the added information elements of the SETUP message received at the message relaying control section 4b are changed to the call reference of the received facilities information element and the connected call reference. Simultaneously with this, a different free channel in the same interface which is used to connect to the already-communicating terminal is captured by the channel capture control section 5a, the message transmission control section 4a being driven and the SETUP message after editing being sent to the exchange 1C.

FIG. 4 shows as one example a specific example of the connection configuration between exchanges which includes a transit exchange, such as shown in FIG. 3B. If the transit exchange 1B is removed from FIG. 4, the configuration is that of the through connection as shown in FIG. 3A.

In FIG. 4, when a request for slave transmission occurs at one of the terminals, terminal 7, which is conducting communication between stations via one medium, at the transmitting-side exchange 1A, the call reference 1 which is used by the already-communicating terminal and the facilities information elements which indicate the added service of slave transmission are added to the SETUP message 51, a different free channel from the output side interface connected to the already-communicating terminal is captured, SETUP message 51 is sent to the receiving-side exchange, the SETUP message (51 in FIG. 3A or 52 in FIG. 3B) is identified at the receiving-side exchange, and receiving of the call is performed with respect to the already-communicating terminal via the specified medium.

In the example of FIG. 4, at the exchange 1A, which requests the slave transmission, when the request for slave transmission is made from terminal 7, the SETUP message 51, which includes common information such as bearer capacity and facilities information elements (which set the slave transmission identifier, call reference 1, and the like) is sent to the station 1B, which is the transit exchange. This station 1B sets the information elements of the received SETUP message 51 into transmission SETUP message 52, and changes the call reference 1 of the facilities information elements to the call reference 3 already being used for communication, a different free channel of the same output-side interface being used to make connection to the entity already conducting communication being captured, and the SETUP message 52 is sent.

Figure 5:
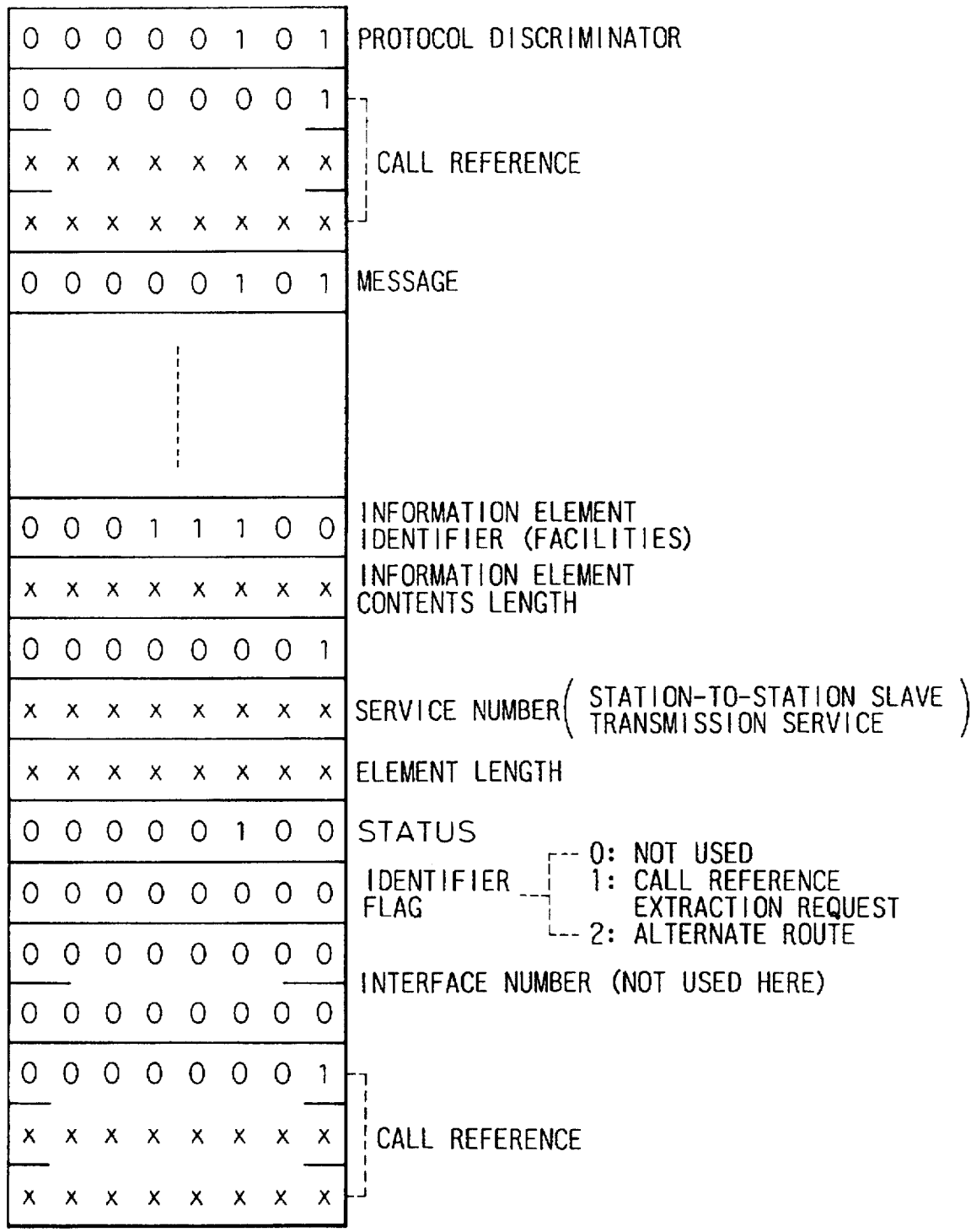
FIG. 5 is a drawing which shows an example of a SETUP message in FIG. 4.
Figure 6:
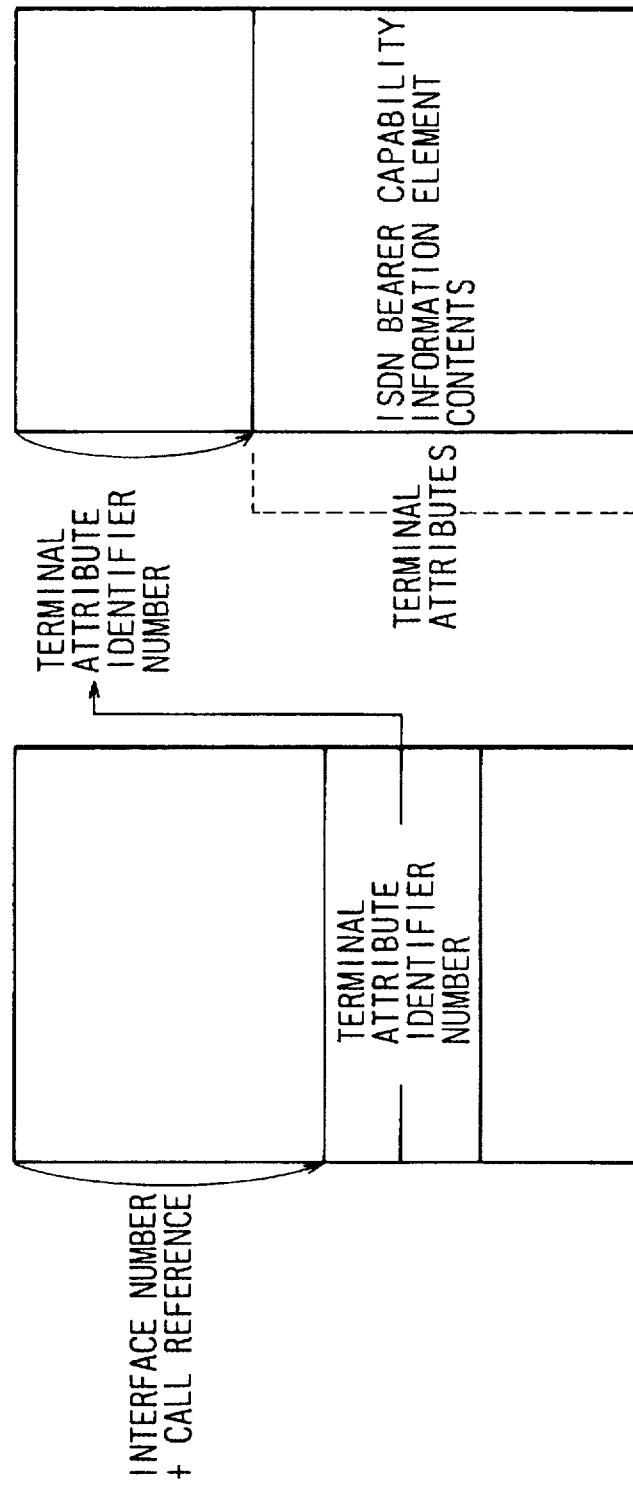
FIG. 6 is a drawing which shows an example of using a terminal attribute storage area.

FIG. 5 shows an example of the format of the above-noted SETUP message. FIG. 6 shows an example of using the terminal attribute storage area 6a shown in FIGS. 2A and 2B.

Figure 7A:
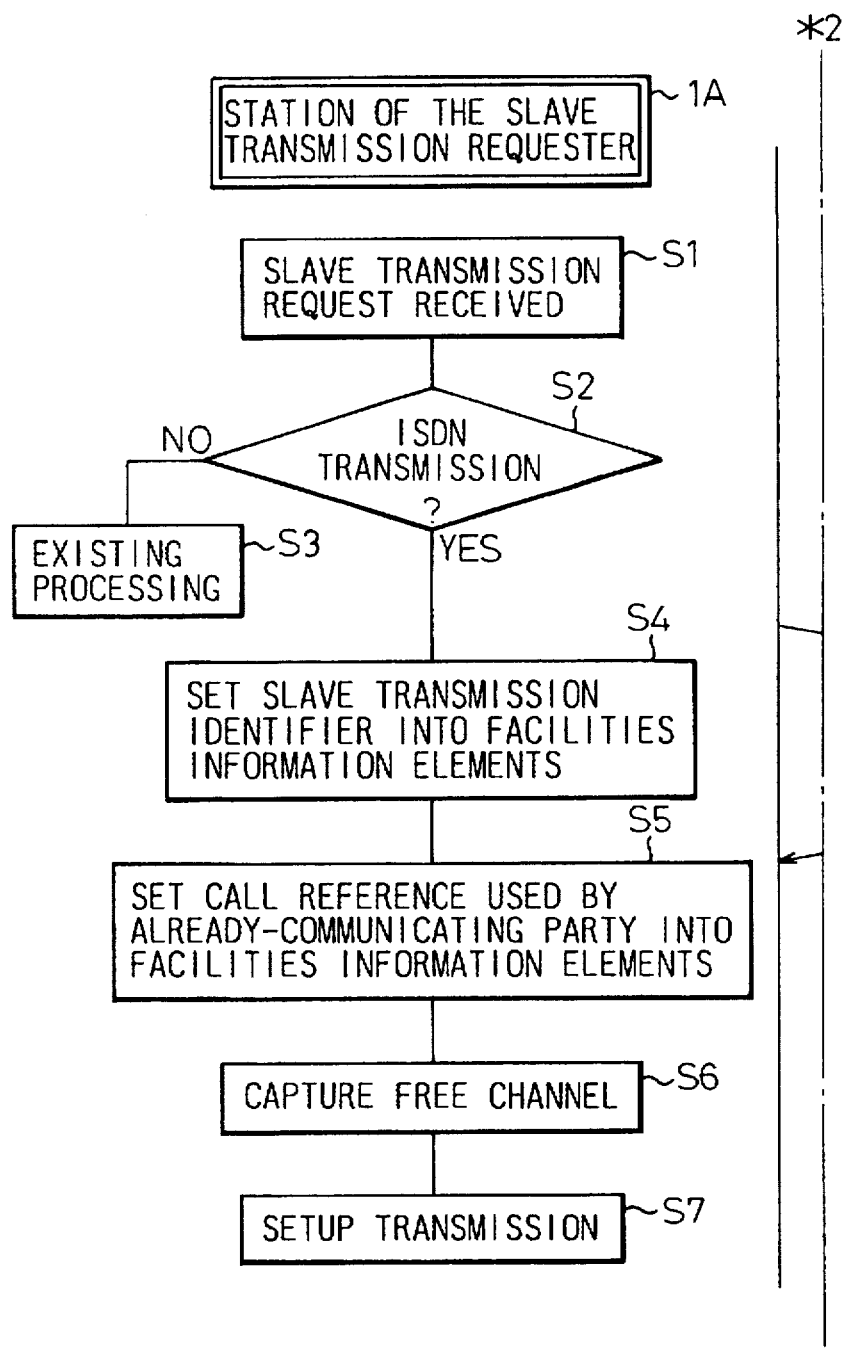
FIGS. 7A and 7B are drawings which show an example of a control sequence of an exchange in FIG. 3A.
Figure 7B:
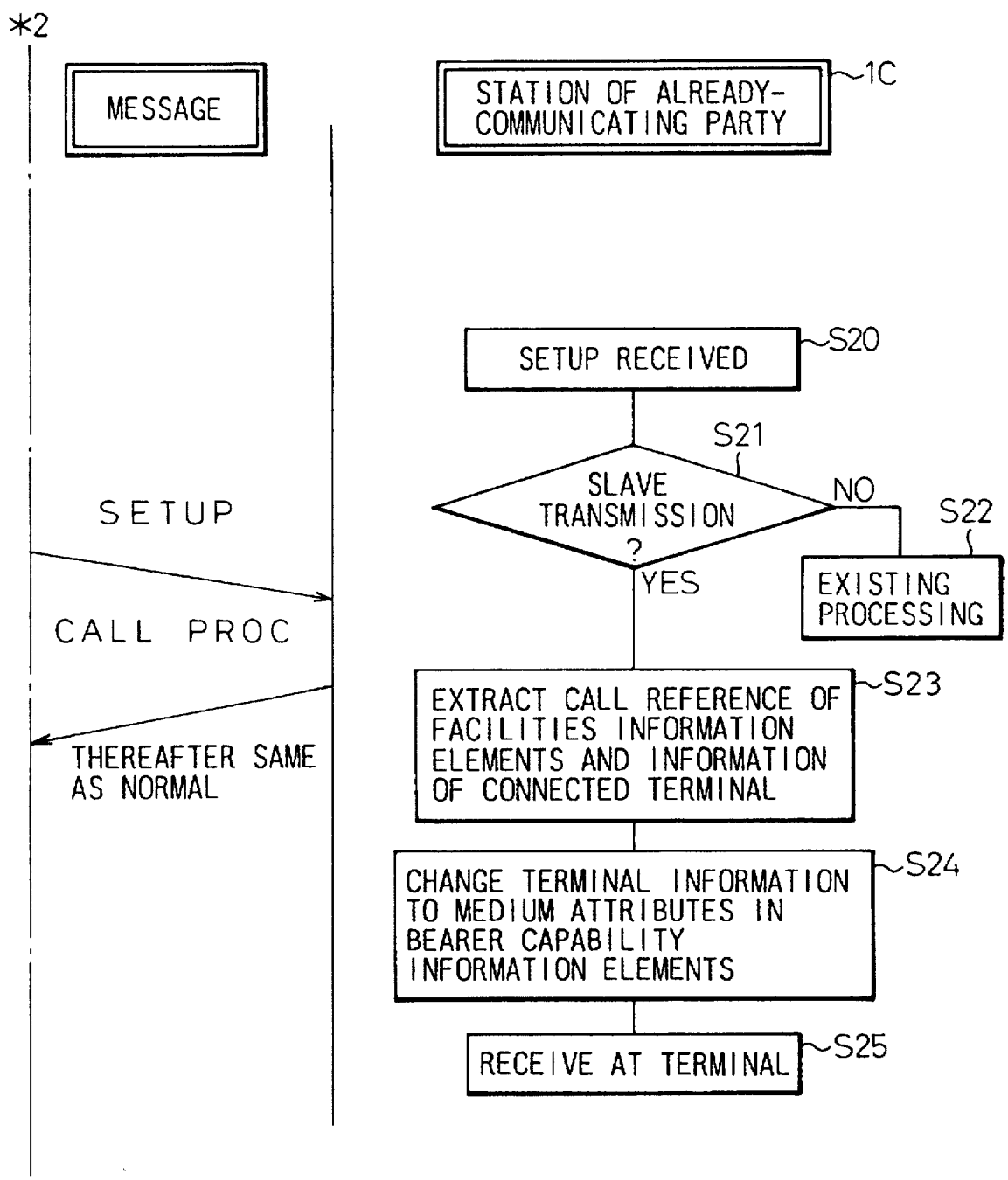

FIGS. 7A and 7B show an example of the switching control sequence which performs an operation in FIG. 3A. This will be described below in relation to FIG. 4.

In FIGS. 7A and 7B, the "station of the slave transmission requester" corresponds to the exchange 1A which is shown in FIG. 3A, and the "station of the entity already in communication" corresponds to the exchange 1C of FIG. 3A. Each of these exchanges 1A and 1C have a configuration as noted above for exchange 1, the sequence in this example being executed by mutual operations between the protocol control section 4 of the control section 3 and the control sections of the switching service control section 5 of each exchange. The configurations of the exchanges and the control sequences in the examples to be described below are the same. The stations 1A and 1C are assumed to support ISDN and to further have a configuration (not shown in the drawing) for the purpose of communication by analog terminals as in the past.

At station 1A of the slave transmission requester, when a slave transmission request is received from an already-communicating terminal which is using one medium (step S1 in FIGS. 7A and 7B) identification is made of whether or not this is a transmission from an ISDN-type terminal (step S2 in FIGS. 7A and 7B). In the case of a non-ISDN type terminal, the existing processing is performed (step S3 in FIGS. 7A and 7B). However, in the case of an ISDN-type terminal, a slave transmission identifier (indicator) is set into the facilities information elements which request added service from the network (step S4 in FIGS. 7A and 7B), and further a call reference 1 which is used by the already-communicating entity is set into the facilities information elements (step S5 in FIGS. 7A and 7B). Next, a free channel is captured from the same output-side interface 1 which is used in the connection to the already-communicating entity (step S6 in FIGS. 7A and 7B), and a SETUP message 51 is sent by means of a layer 3 (calling control) protocol via channel D step S7 in FIGS. 7A and 7B).

When this SETUP message 51 is received at the other party communicating with the already-communicating entity (hereinafter referred to as station 1C) (step S20 in FIGS. 7A and 7B), the information elements thereof are examined to identify whether or not this is a slave transmission (step S21 in FIGS. 7A and 7B). In the case in which it is not a slave transmission, the corresponding existing processing is performed (step S22 in FIGS. 7A and 7B). In the case of slave transmission, however, the call reference 1 and connected-terminal information which are set into the facilities information elements are extracted (step S23 in FIGS. 7A and 7B), the terminal information element being changed to a medium attribute of bearer capability, which is included in the SETUP message (step S24 in FIGS. 7A and 7B), receiving being done from the same already-communicating entity via a different medium (step S25 in FIGS. 7A and 7B). In this case, while it is not shown in the drawing, the passing of messages such as the ALERT (notification of calling), CONN (notification of response of called party), and CONN-ACK (acknowledgment of CONN) messages is performed as in the past, by means of an ISDN layer 3 protocol.

Figure 8:
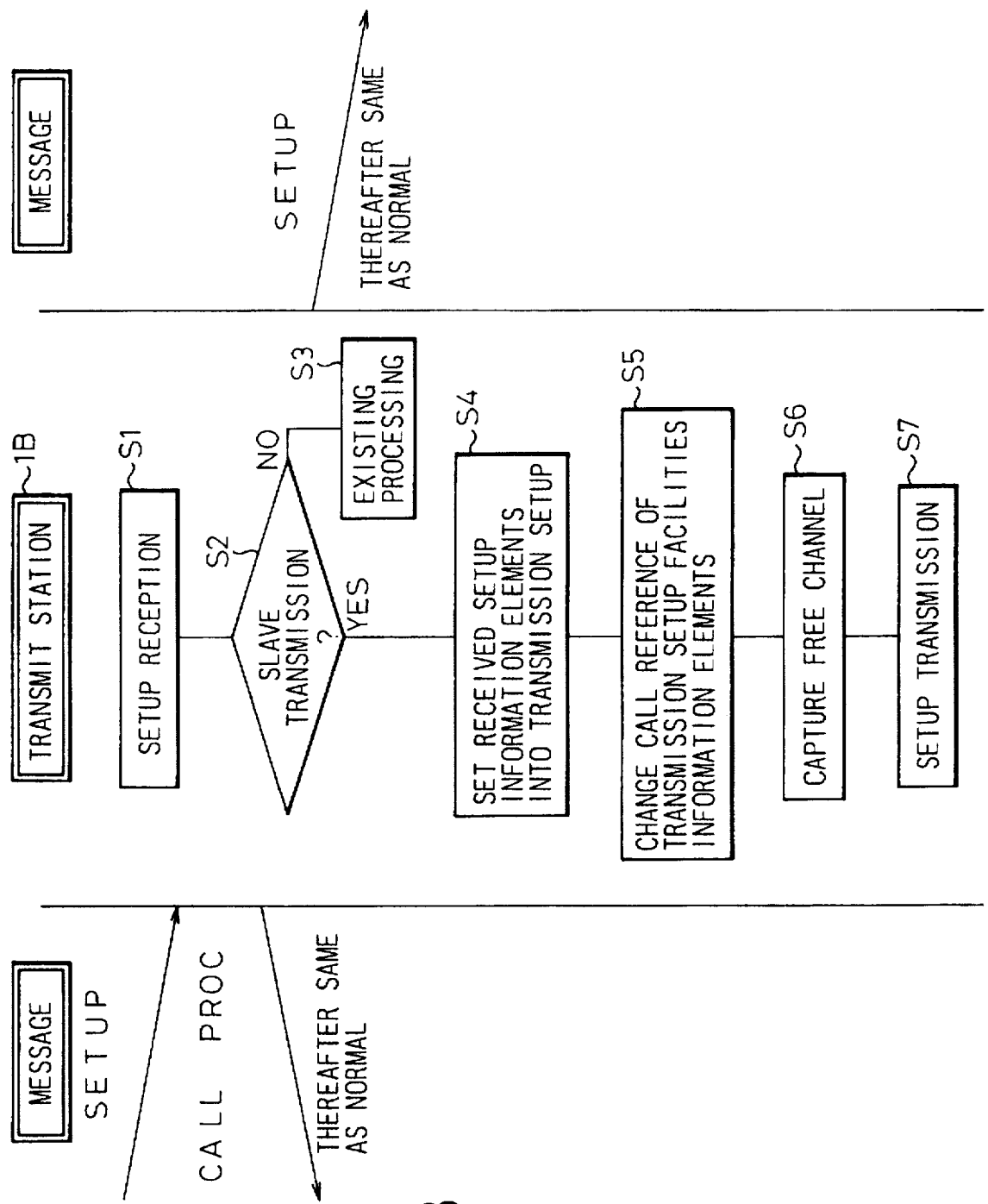
FIG. 8 is a drawing which shows an example of a control sequence in a relay station of FIG. 3B.

FIG. 8 shows an example of the control sequence in the transit exchange which is shown in FIG. 3B. This will also be described in relation to FIG. 4.

In FIG. 8, the exchange denoted 1B corresponds to the transit exchange which is shown in FIG. 3B. When the transit exchange 1B receives a SETUP message 51 which is sent from the transmitting-side station 1A (step S1 in FIG. 8), a check is made as to whether or not a slave transmission identifier (indicator) is included in the added information elements (step S2 in FIG. 8). If this is not a slave transmission, the corresponding existing processing is performed (step S3 in FIG. 8). In the case of slave transmission, the information elements of the received SETUP message 51 are set into the transmission SETUP message 52 (step S4 in FIG. 8), the call reference of the facilities information elements of the transmission SETUP message 52 are changed to the call reference 3 which is used in the connection between the already-communicating terminal and the station 1B (step S5 in FIG. 8), a free channel in the same interface 2 used already in communication is captured (step S6 in FIG. 8), and the above-noted SETUP message 52 is sent to either the next station or to the receiving station 1C (step S7 in FIG. 8).

What follows is a description of the making of an alternate route connection for slave transmission in FIG. 3C.

In this case, the station control sections 5c of each of the exchanges 1A through 1C in the path between terminal 7 and terminal 8 perform extraction of station number from the numerical information from the dialed numbers when a call is made, this being stored into the area 6b of the memory 6. By means of the slave transmission from terminal 7, exchange 1A sends a SETUP message to which are added information elements which include indication of the slave transmission, in the same manner as described above with regard to the exchange 1B. In the case in which a different channel in the same interface that connects the already-communicating terminal 8 to the exchange 1C is not free, the transit exchange 1B at the message transmission control section 4b of the transit exchange 1B transmits a facility message (FACILITY) to which is added the facilities information elements, which include the extraction request for the interface number and call reference used by the entity already in communication at the station 1C which houses the already-communicating terminal 8, to a D channel in the same interface which connects to the already-communicating terminal 8.

When the exchange 1C receives this message and extracts the requested information (interface number and call reference), and sets it into the facilities information elements, this information is added to the facility acknowledge message (FACILITY_ACK), which is sent from the message transmission control section 4a to the above-noted transit exchange 1B. When the transit exchange 1B detects the information included in this FACILITY_ACK message, this information is set into the information elements which are added to the SETUP message, the indicator for an alternate route slave transmission is set, and the SETUP message is sent, after capturing the alternate route channel to the exchange 1D.

When the exchange 1D, which performs the alternate route relaying, receives the SETUP message, the fact that this slave transmission indicator is using an alternate route is detected at the message receiving control section 4c, the received information elements being added to the SETUP message by the message relaying control section 4b, a free channel to the exchange 1C of the already-communicating terminal being captured by the channel capture control section 5a, and the message being sent by the message transmission control section 4a. When the exchange 1C receives this SETUP message, because this slave transmission indicator is for alternate routing, the circuit connection control section 5b changes the call reference corresponding to the interface number added to the information elements and the terminal attributes in memory 6, which correspond to the connected terminal 8, to the medium of the received information elements, so that terminal 8 receives the call.

While the alternate routing shown in FIG. 3C is performed via an exchange which exists within the same network, it is also possible to perform the alternate route connection via a different network which supports ISDN. A specific example of FIG. 3C will be described below.

Figure 9:
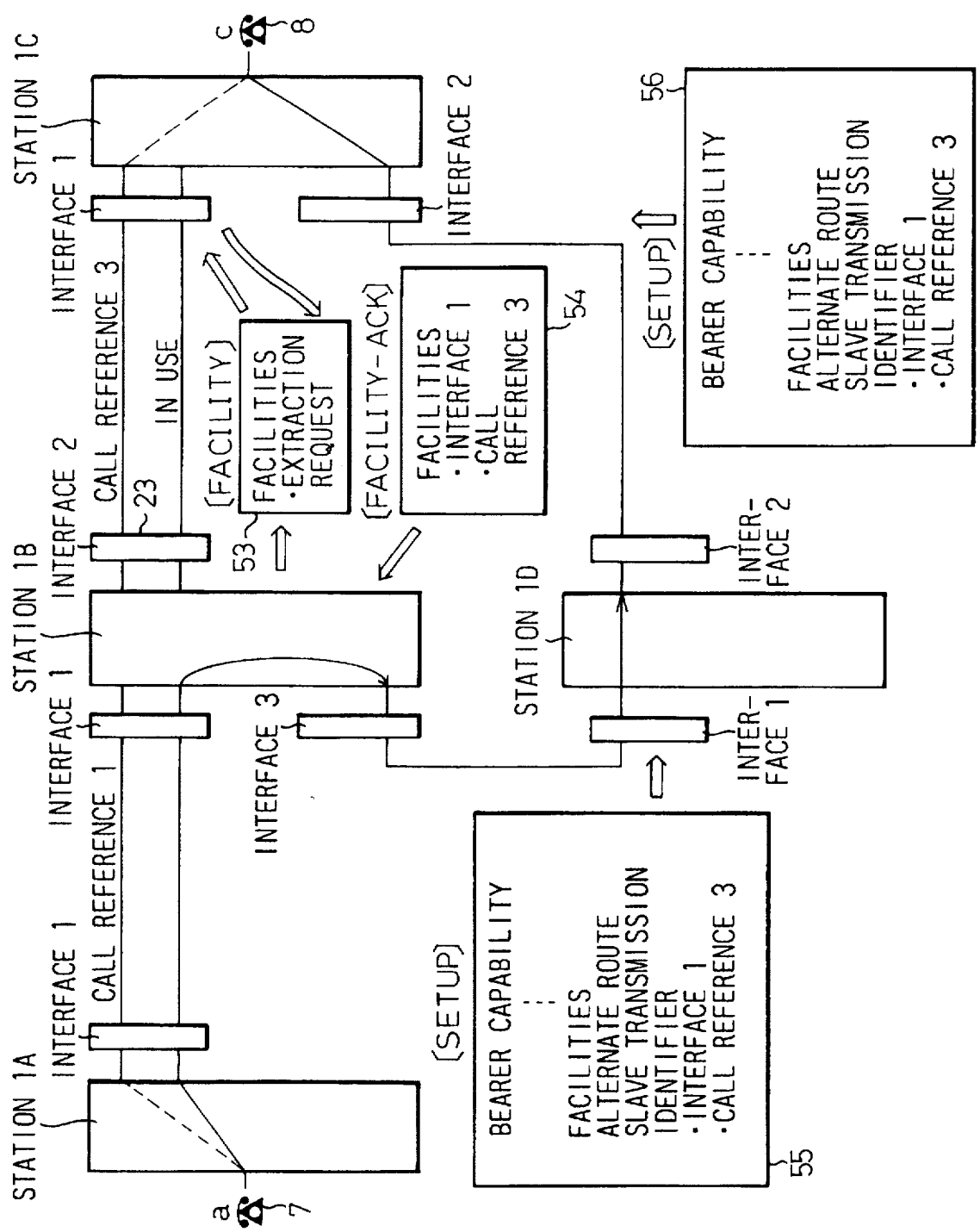
FIG. 9 is a drawing which shows an example of the mutual connection configuration between stations which includes an alternate route station in FIG. 3C.

FIG. 9 shows an example of a mutual connection configuration which includes an alternate route connection.

Figure 10:
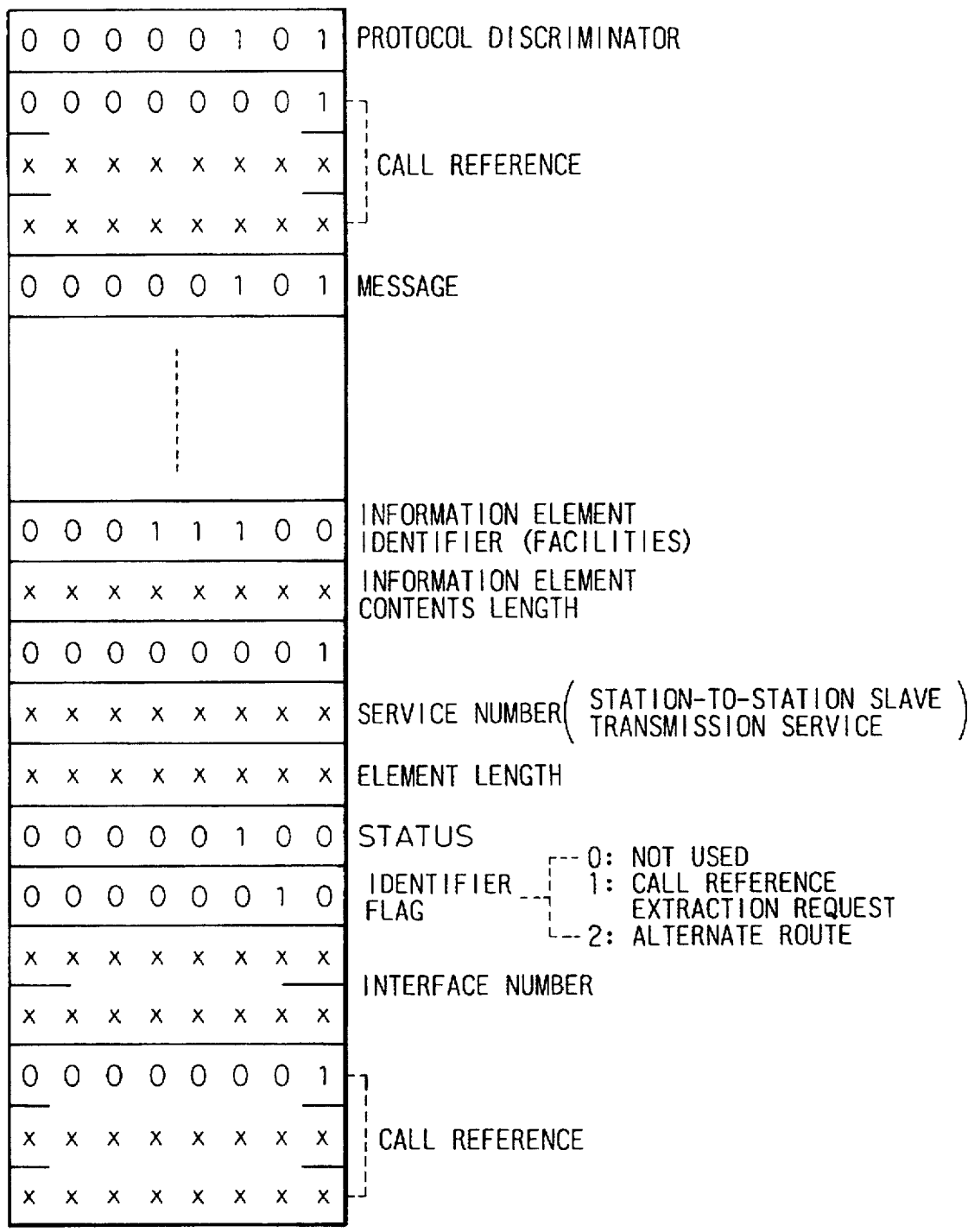
FIG. 10 is a drawing which shows an example of a SETUP message in FIG. 9.
Figure 11:
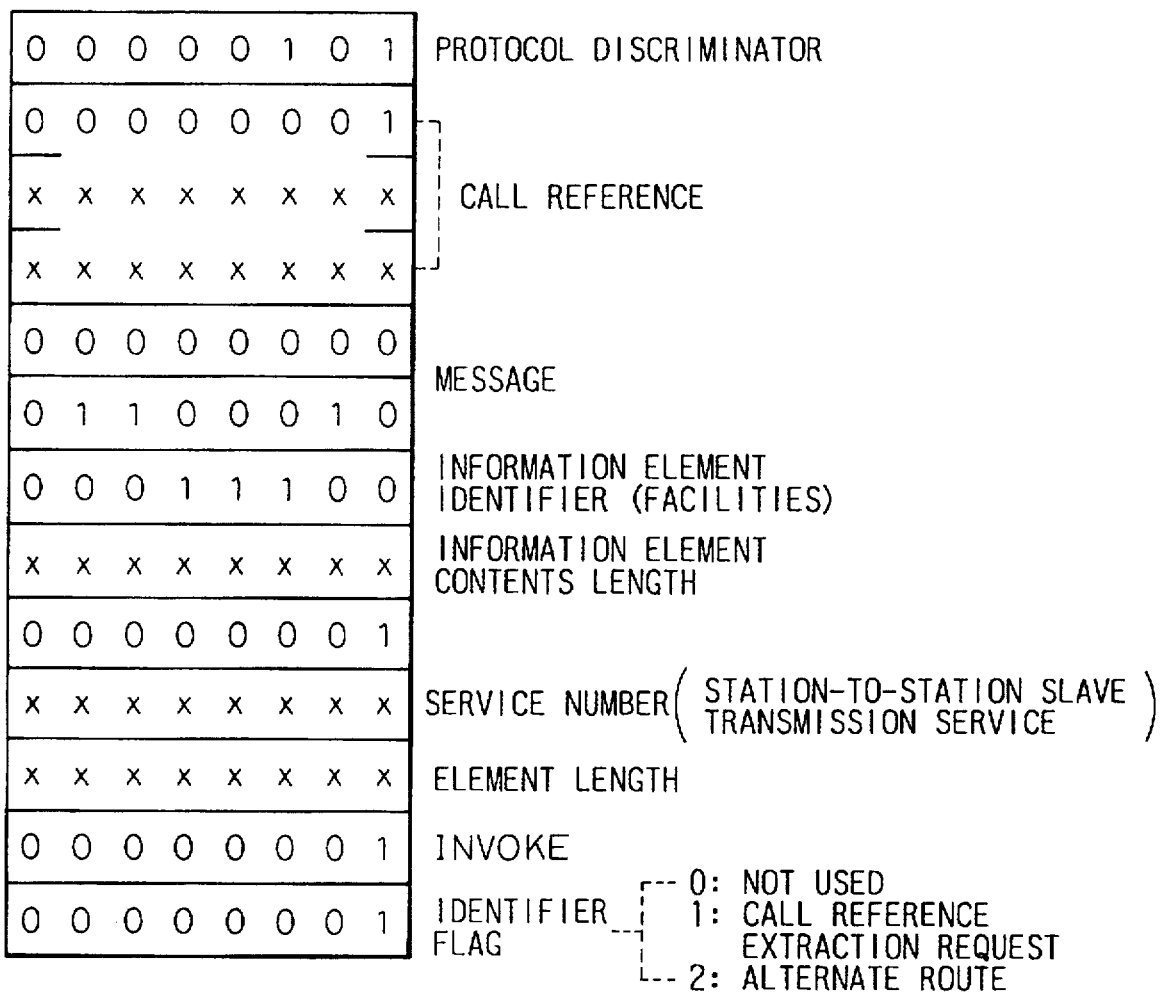
FIG. 11 is a drawing which shows an example of a FACILITY message in FIG. 9.
Figure 12:
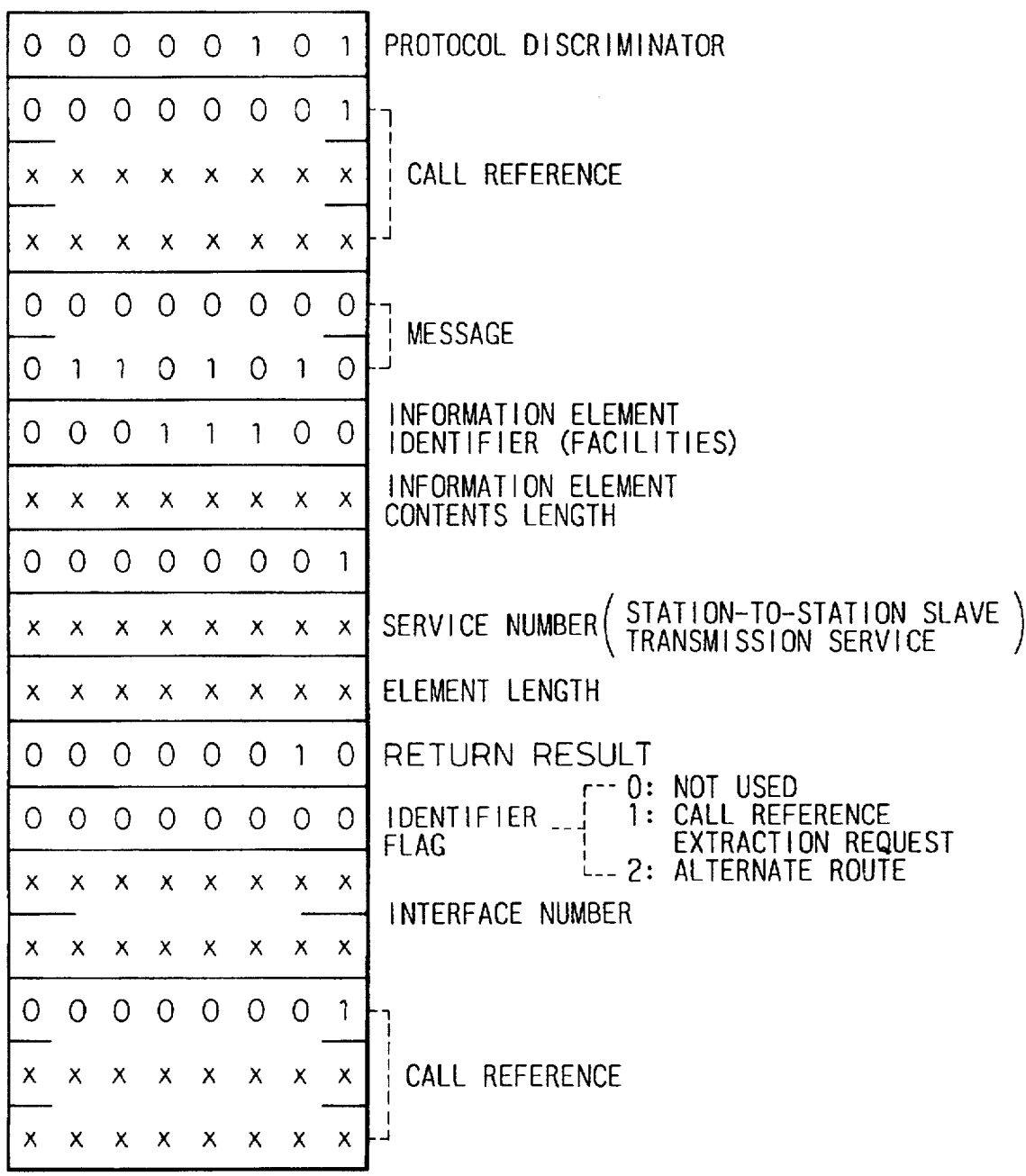
FIG. 12 is a drawing which shows an example of a FACILITY_ACK message in FIG. 9.

FIG. 10 shows an example of the format of a SETUP message in the above-noted example. FIGS. 11 and 12 show examples of the FACILITY and FACILITY_ACK messages, respectively. FIG. 13 shows an example of using the station number storage area which is shown in FIGS. 2A and 2B.

In FIG. 9, stations 1A through 1D are positioned with terminal 7 of station 1A and terminal 8 of station 1C communicating by means of one medium, via an interface 1 at the output side of station 1A and at the input side of the transit station 1B (call reference 1), and an interface 2 at the output side of the station 1B and an interface 1 at the input side of station 1C (call reference 3). Slave transmission is performed from terminal 7, and at station 1B, if an attempt is made to capture a free channel in the same output side interface as is being used already for communication but all channels are in use, it is not possible to make a connection for slave transmission from exchange 1B to exchange 1C using the interface that is already being used for communication. In this case, the alternate route connection switching procedure described below is executed.

FIGS. 14A through 16 show an example of the switching control sequence for making an alternate route connection in the case in which all channels in the same interface are in use. This will be described below, with relation to FIG. 9.

In FIGS. 14A and 14B and FIGS. 15A and 15B, the "station with all channels in use" corresponds to the transit station 1B in the configuration of FIG. 9, and the "station already in communication" corresponds to the receiving side station 1C, in which is connected the terminal (already-communicating terminal) 8 of the other party. The "transit station" shown in FIG. 16 corresponds to the alternate route station 1D shown in FIG. 9.

Figure 14A:
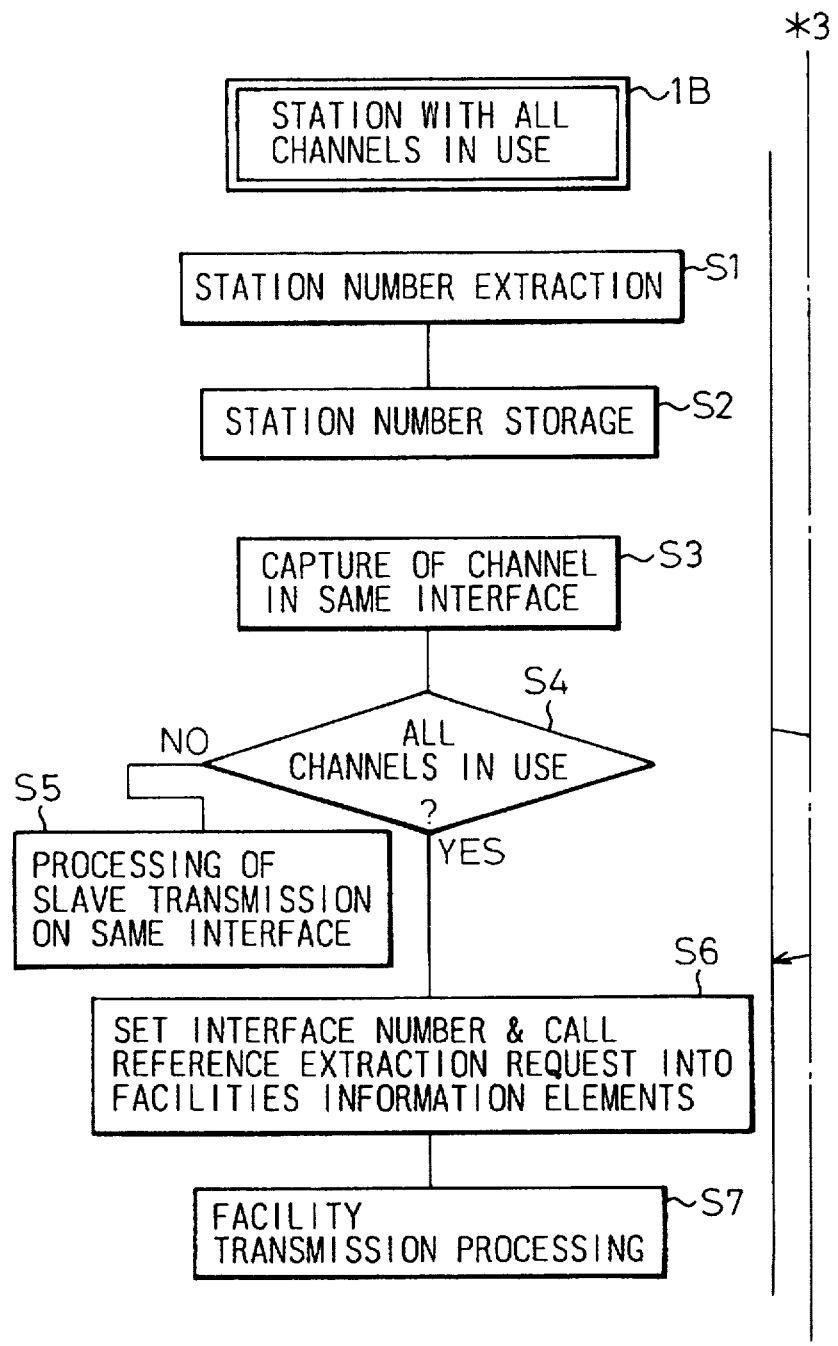
FIGS. 14A and 14B are drawings which show part (1) of a control sequence for alternate route connection in FIG. 3C.
Figure 14B:
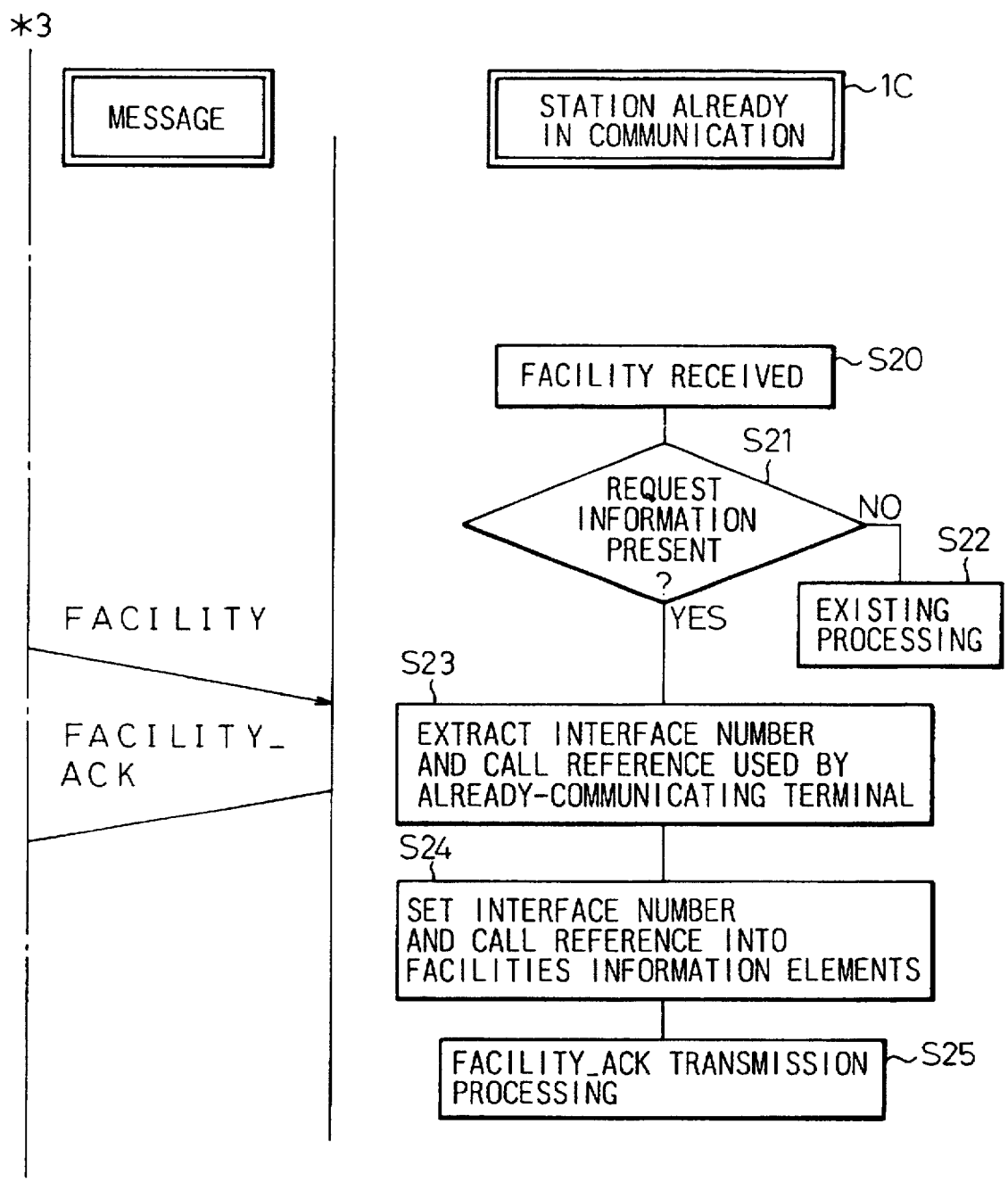

In FIGS. 14A and 14B, at first at all stations, including station 1A of the call-requesting party and the transit station 1B, the usual dialed number information before slave transmission is used to perform extraction at the station number control section 5c of the number of the receiving station, this being stored in the station number storage area 6b. In FIGS. 14A and 14B, a station number, which is previously registrated in correspondence to a dialed number, is extracted from the station number registration data of a normal transmission. In step S2, the extracted station number is stored into the station number storage data that is indexed by an interface and a call reference. FIG. 13 shows an example of the station number storage area 6b using the dialing number.

Thereafter, when a SETUP message to which is added information elements which include a slave transmission identifier from station 1A is sent from the terminal 7 to the station 1B, at transit station 1B capture processing is performed of a free channel in the interface 2 which is already being used for communication (step S3 in FIGS. 14A and 14B). As a result of this processing, a judgment is made as to whether or not all channels are in use (step S4 in FIGS. 14A and 14B), and if there is a free channel, slave transmission processing is performed on the above-noted same interface (step S5 in FIGS. 14A and 14B). However, if all channels are in use, a FACILITY message 53 is generated, the interface number and call reference extraction request being set into the information elements thereof (step S6 in FIGS. 14A and 14B), and the message being sent to the station 1C (step S7 in FIGS. 14A and 14B).

At station 1C, when the above-noted FACILITY message 53 is received (step S20 in FIGS. 14A and 14B), a judgment is made as to whether or not there is the above-noted extraction request (step S21 in FIGS. 14A and 14B), and if there is no request, the existing processing is performed. If, however, there is a request, the interface number and call reference used by the terminal already in communication are extracted (step S23 in FIGS. 14A and 14B). In the example shown in FIG. 9, extraction is done of the input-side interface 1 and call reference 3 which are being used by the already-communicating terminal in the station 1C. This extracted interface number 1 and call reference 3 are set into facilities information elements (step S24 in FIGS. 14A and 14B), a FACILITY_ACK message 54 being sent from station 1C (step S25 in FIGS. 14A and 14B) to the station 1B which has sent the FACILITY message 53.

Figure 15A:
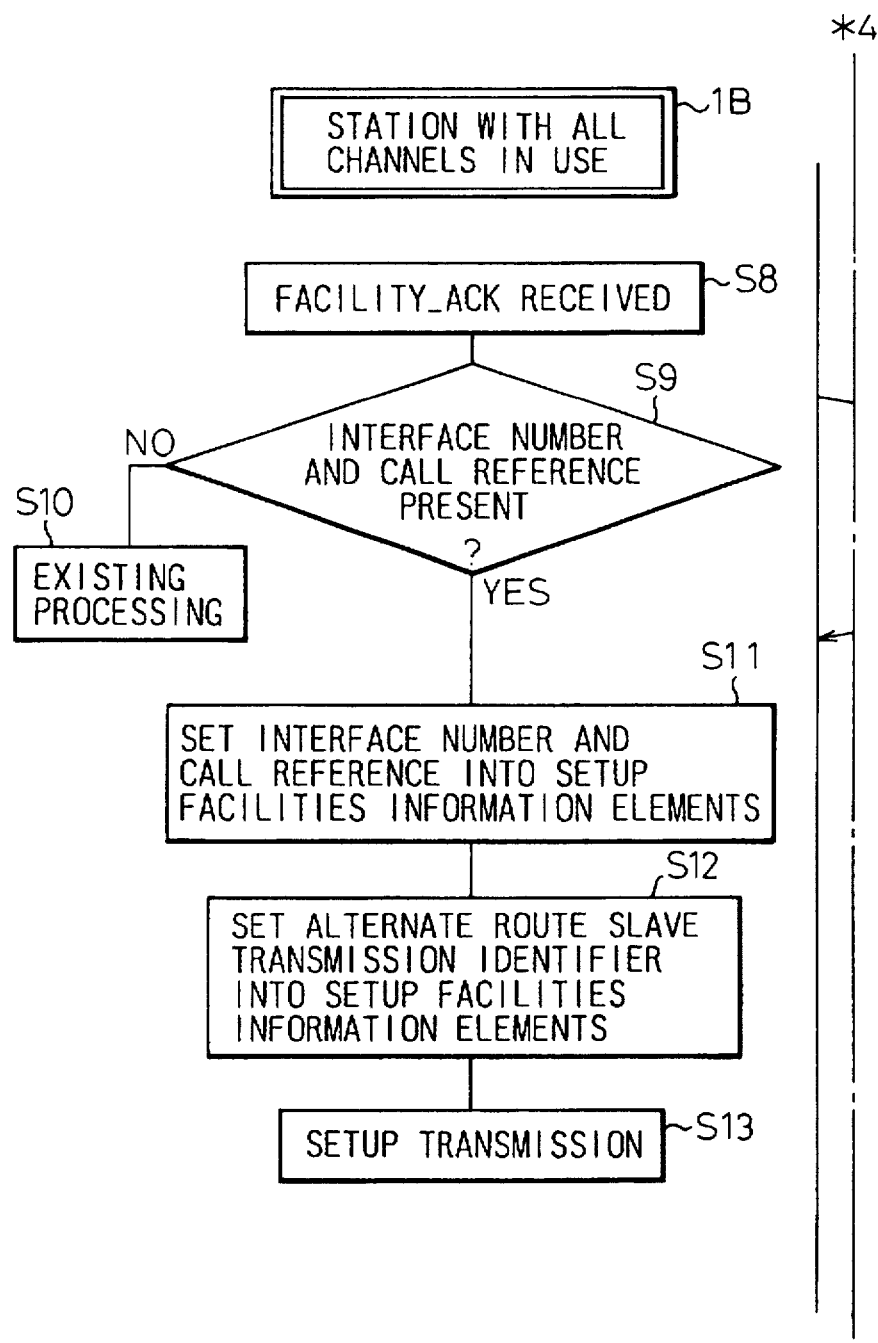
FIGS. 15A and 15B are drawings which show part (2) of a control sequence for alternate route connection in FIG. 3C.
Figure 15B:
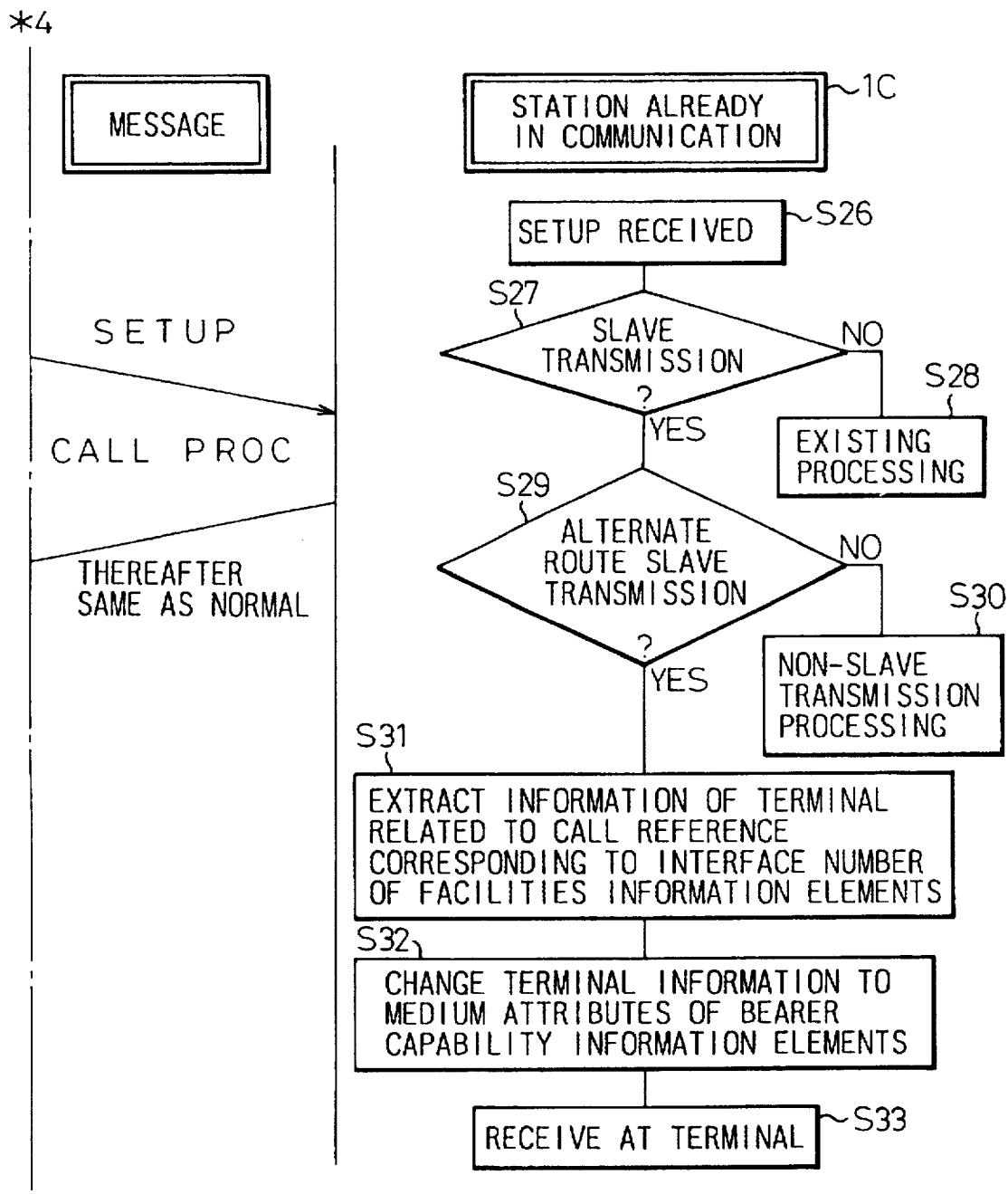

Next, as shown in FIGS. 15A and 15B, when the FACILITY_ACK message 54 from the station 1C is received (step S8 in FIGS. 15A and 15B), a judgment is made as to the presence of an interface number and call reference (step S9 in FIGS. 15A and 15B). If they are not present, the existing processing is performed (step S10 in FIGS. 15A and 15B). If they are present, however, the received interface number 1 and call reference 3 are set in the information elements of a SETUP message (step S11 in FIGS. 15A and 15B), simultaneous with which the slave transmission identifier of the alternate routing request is set into the facilities information elements (step S12 in FIGS. 15A and 15B), after which the SETUP message 55 is sent to the alternate station 1D (step S13 in FIGS. 15A and 15B). When doing this, the alternate channel is captured by means of a pre-stored station number (number of a station which is extracted in normal communication from terminal 7 to terminal 8), and the SETUP message 55 is sent.

Figure 16:
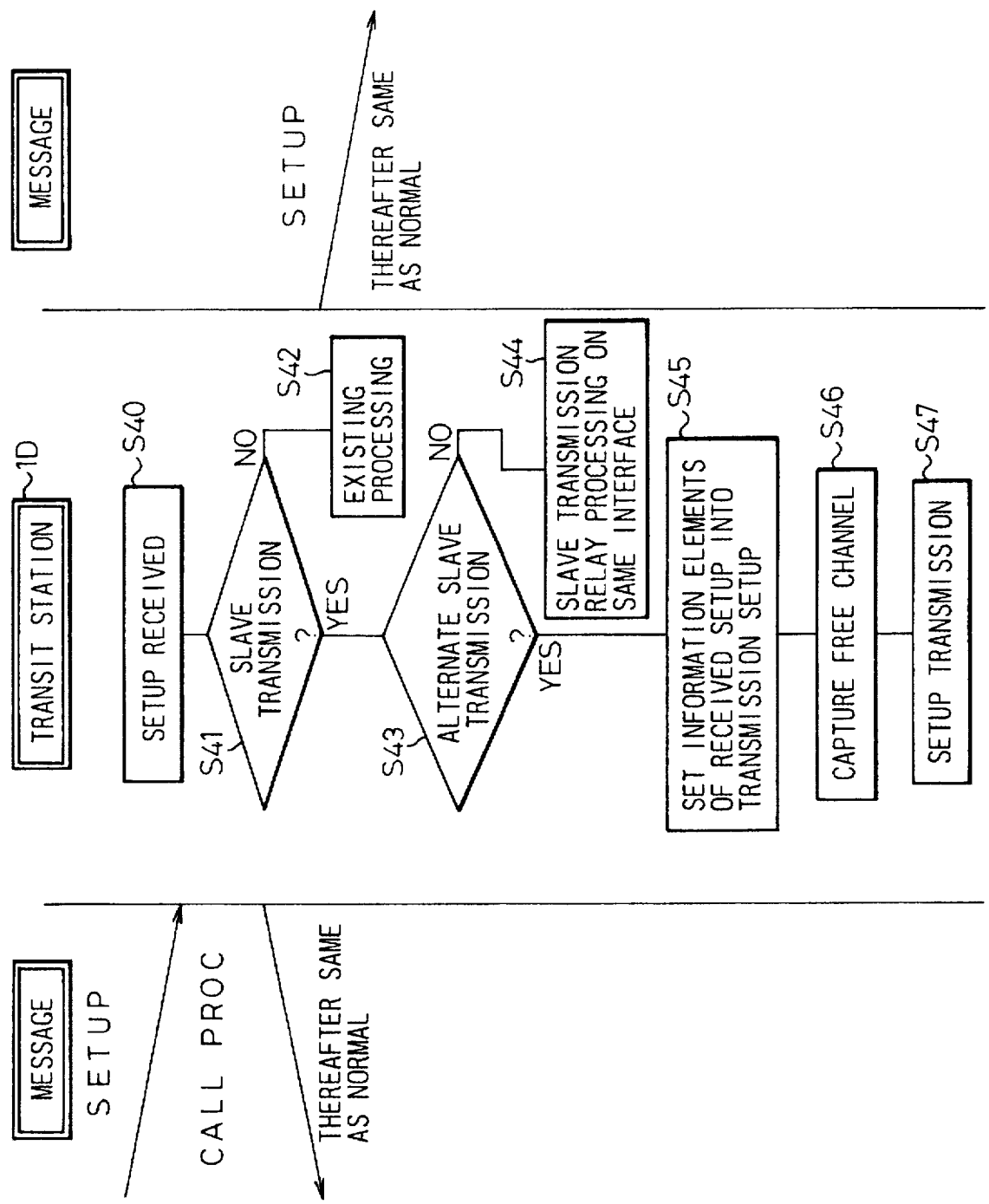
FIG. 16 is a drawing which shows part (3) of a control sequence for alternate route connection in FIG. 3C.

Turning next to FIG. 16, the SETUP message 55 from station 1B is received at the transit station 1D. When the SETUP message 55 is received (step S40 in FIG. 16), a judgment is made as to whether or not this is a slave transmission (step S41 in FIG. 16), and if it is not a slave transmission the existing processing is performed (step S41 in FIG. 16). If, however, it is a slave transmission, identification is next made of whether or not it is an alternate route slave transmission (step S43 in FIG. 16). If it is not an alternate route slave transmission, relaying processing of the slave transmission is performed using the same interface (step S44 in FIG. 16). If it is an alternate route slave transmission, however, the information elements of the received SETUP message 55 are set into the transmission SETUP message 56 (step S45 in FIG. 16), a free channel is captured (step S46 in FIG. 16), and the SETUP message 56 for transmission is sent (step S47 in FIG. 16).

The SETUP message 56 sent from the transit station 1D in FIG. 16 is sent to the station 1C which houses the already-communicating terminal 8 in FIG. 9. The control of station 1C is shown in FIGS. 15A and 15B. In FIGS. 15A and 15B, when the SETUP message 56 sent from the transit station is received (step S26 in FIGS. 15A and 15B), a judgment is made as to whether or not this is a slave transmission (step S27 in FIGS. 15A and 15B), and if it is not a slave transmission the existing processing is performed (step S28 in FIGS. 15A and 15B). If, however, it is a slave transmission, a judgment is made as to whether it is an alternate route slave transmission (step S29 in FIGS. 15A and 15B). If it is not an alternate route slave transmission, receiving processing is performed on the same interface as the already-communicating terminal. If, however, it is an alternate route slave transmission (that is, sent from station 1D), extraction is performed (step S31 of FIGS. 15A and 15B) of the interface number 1 and the call reference 3 which corresponds thereto from the facilities information elements (step S31 of FIGS. 15A and 15B), the corresponding terminal information being changed to the medium attributes in the bearer capability information elements attached to the received SETUP message (step S32 of FIGS. 15A and 15B). Then receipt of a call is performed at terminal 8 (step S33 in FIGS. 15A and 15B).

Next, the control sequence in the case in which all channels at the transit station are in use will be described.

Figure 17:
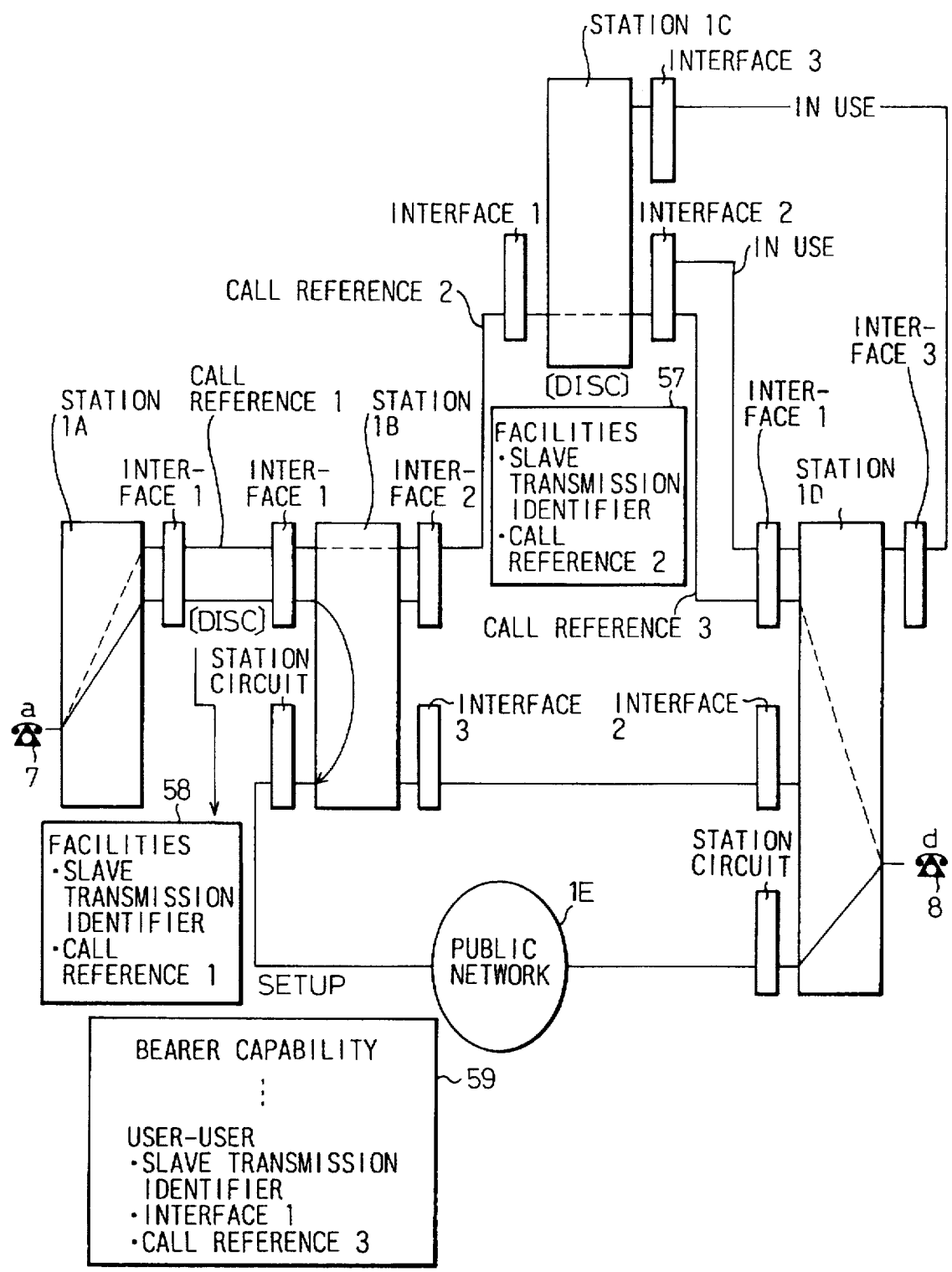
FIG. 17 is a drawing which shows an example of a mutual connection configuration between stations for the case in which all channels are in use in FIG. 9.

FIG. 17 shows an example of the connection configuration between stations for the case in which, because all channels are in use, the call is released.

Figure 18:
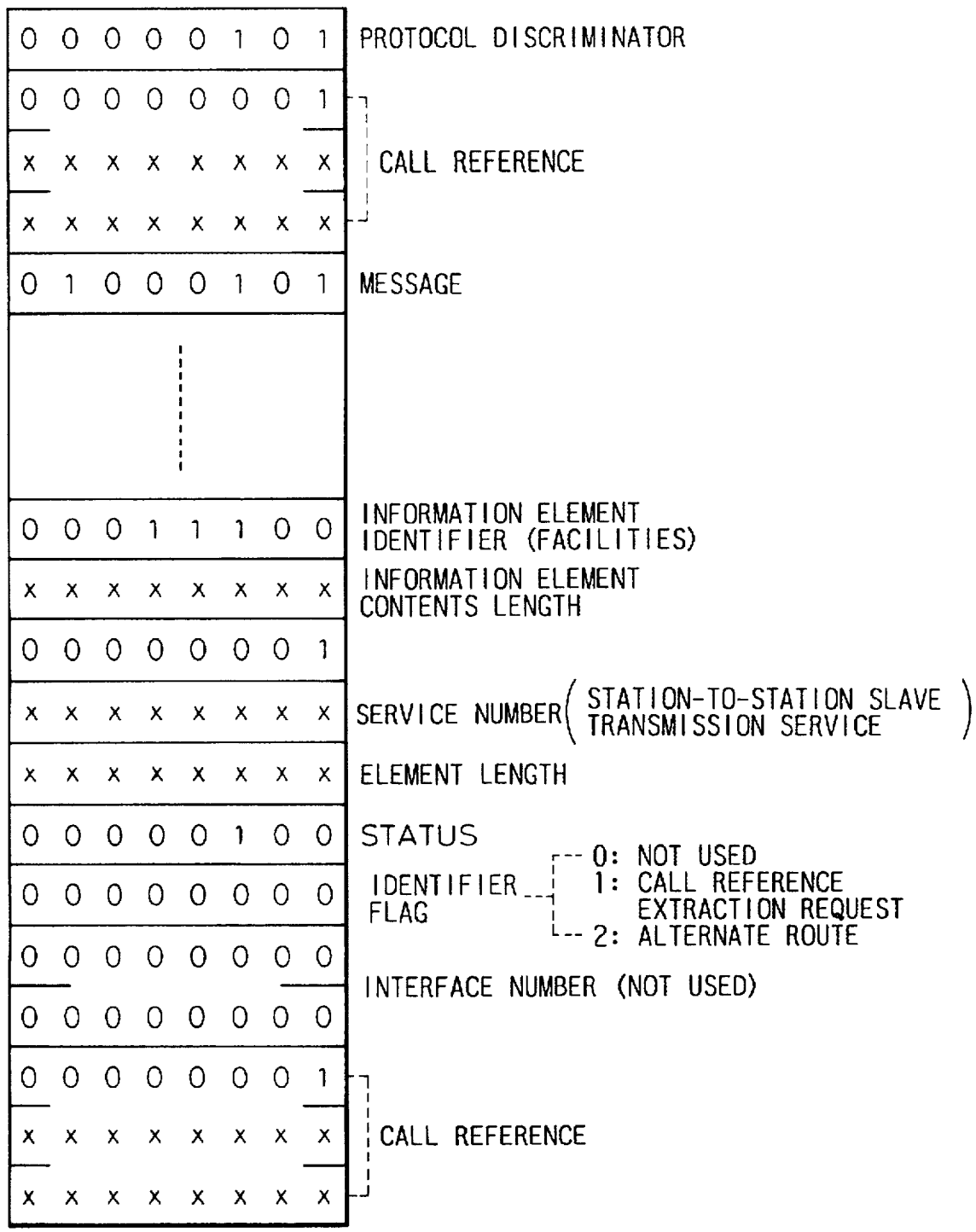
FIG. 18 is a drawing which shows an example of a DISC message in FIG. 17.
Figure 19:
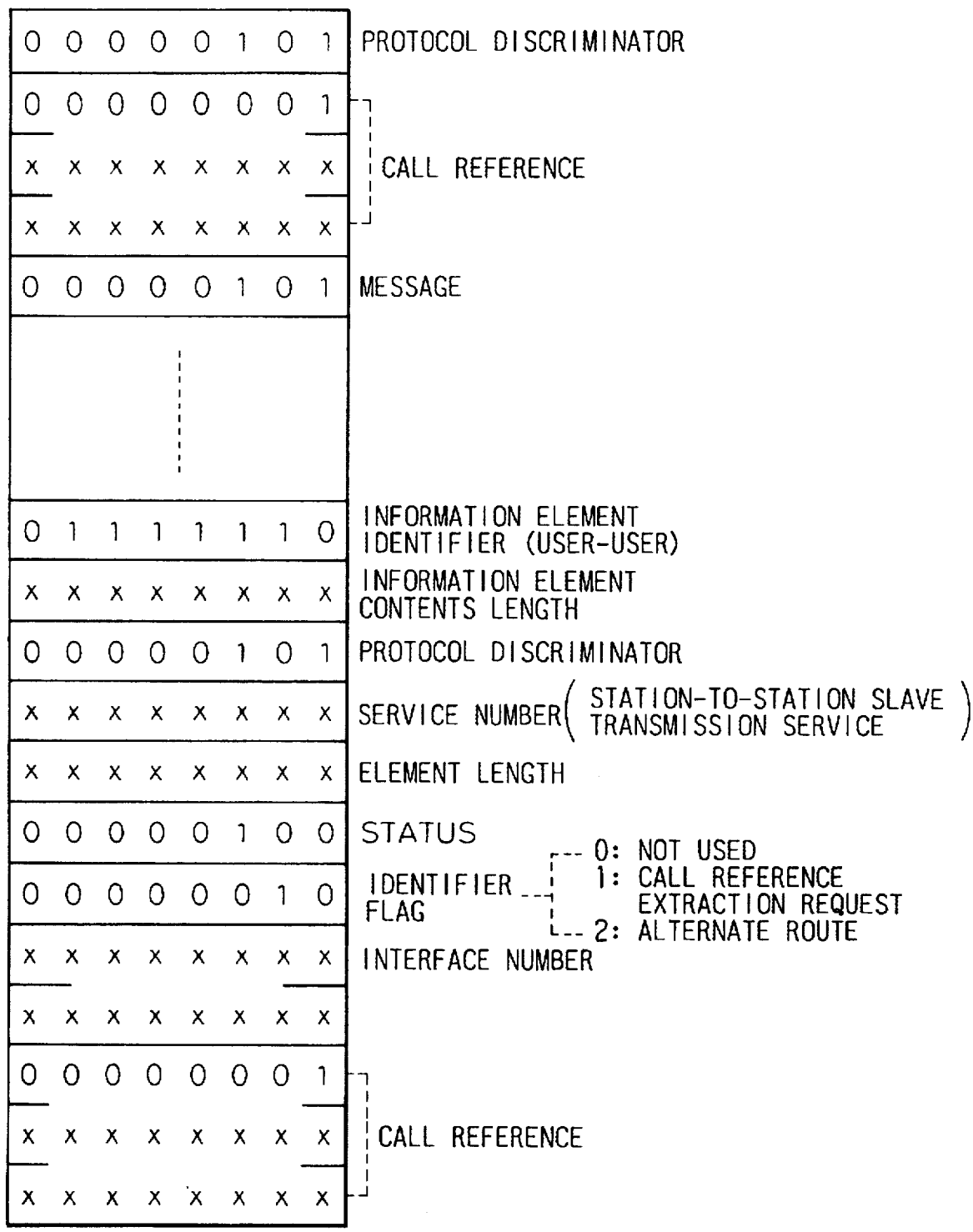
FIG. 19 is a drawing which shows an example of a SETUP message in FIG. 17.

FIG. 18 shows an example of the DISC message in this example, and FIG. 19 shows a SETUP message.

Figure 20A:
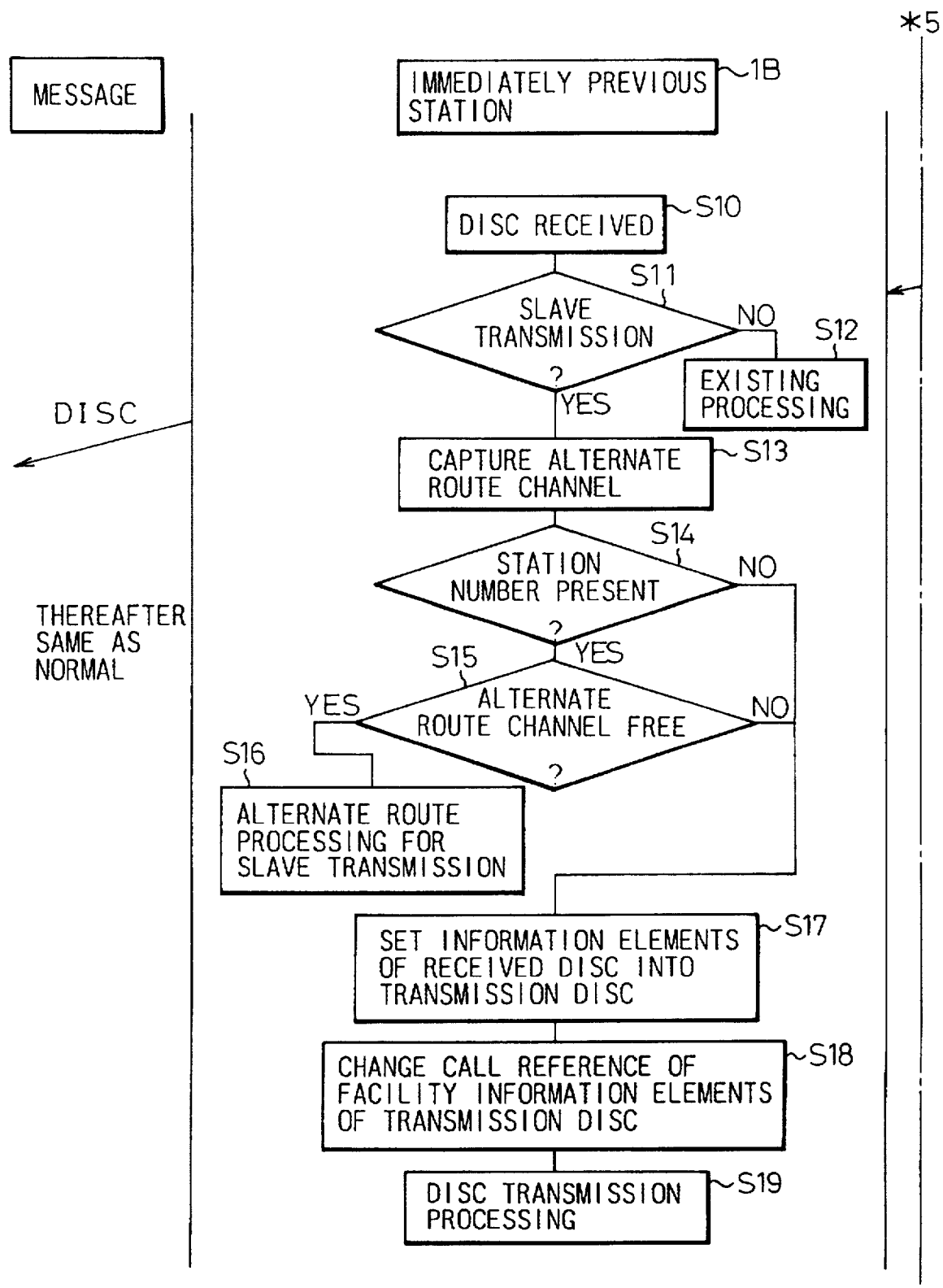
FIGS. 20A and 20B are drawings which show part (1) of a control sequence for alternate route connection in FIG. 9.
Figure 20B:
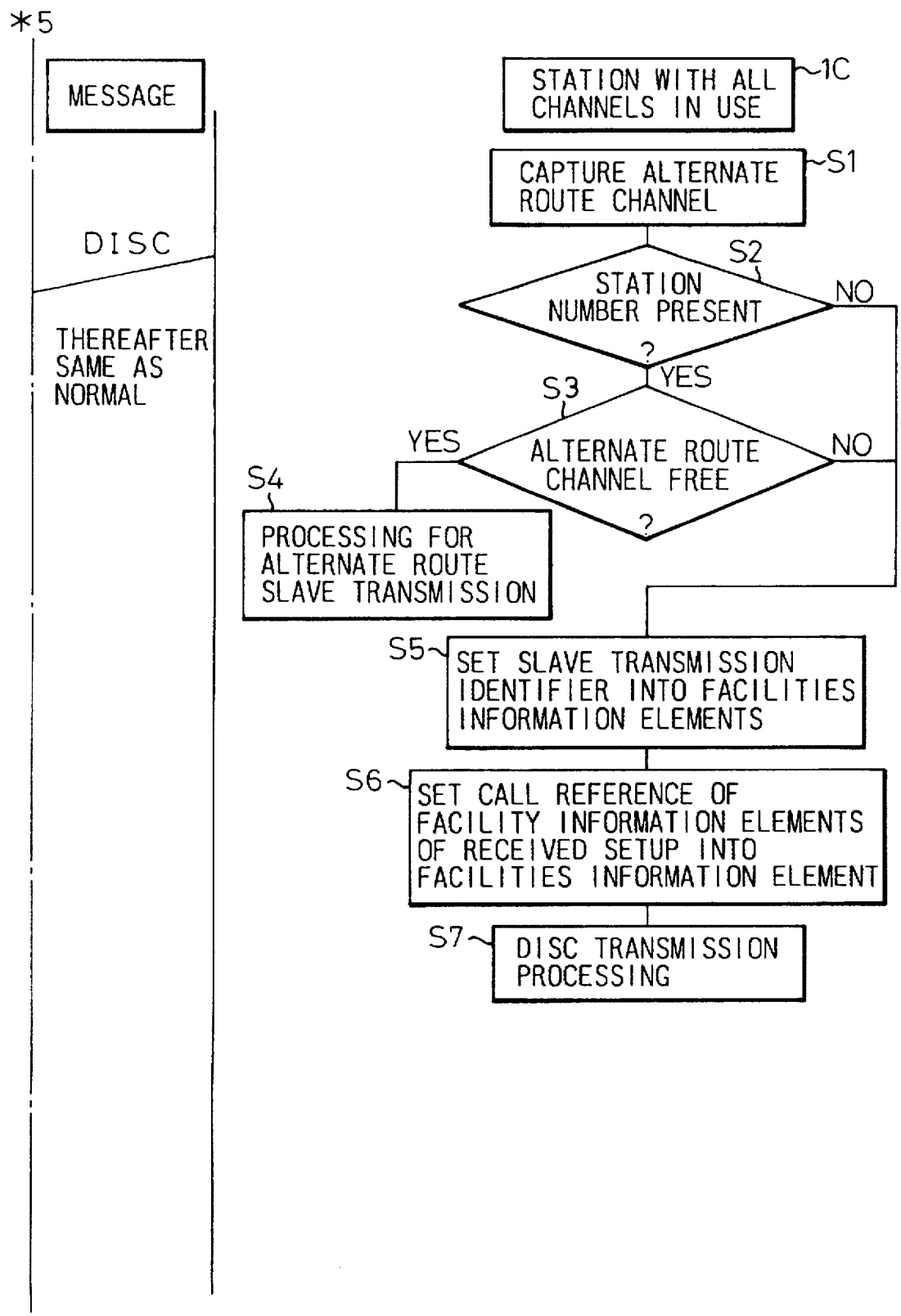

FIGS. 20A and 20B show an example of the control sequence for the case in which a call is released when all channels in the transit station performing relaying are in use.

Figure 21A:
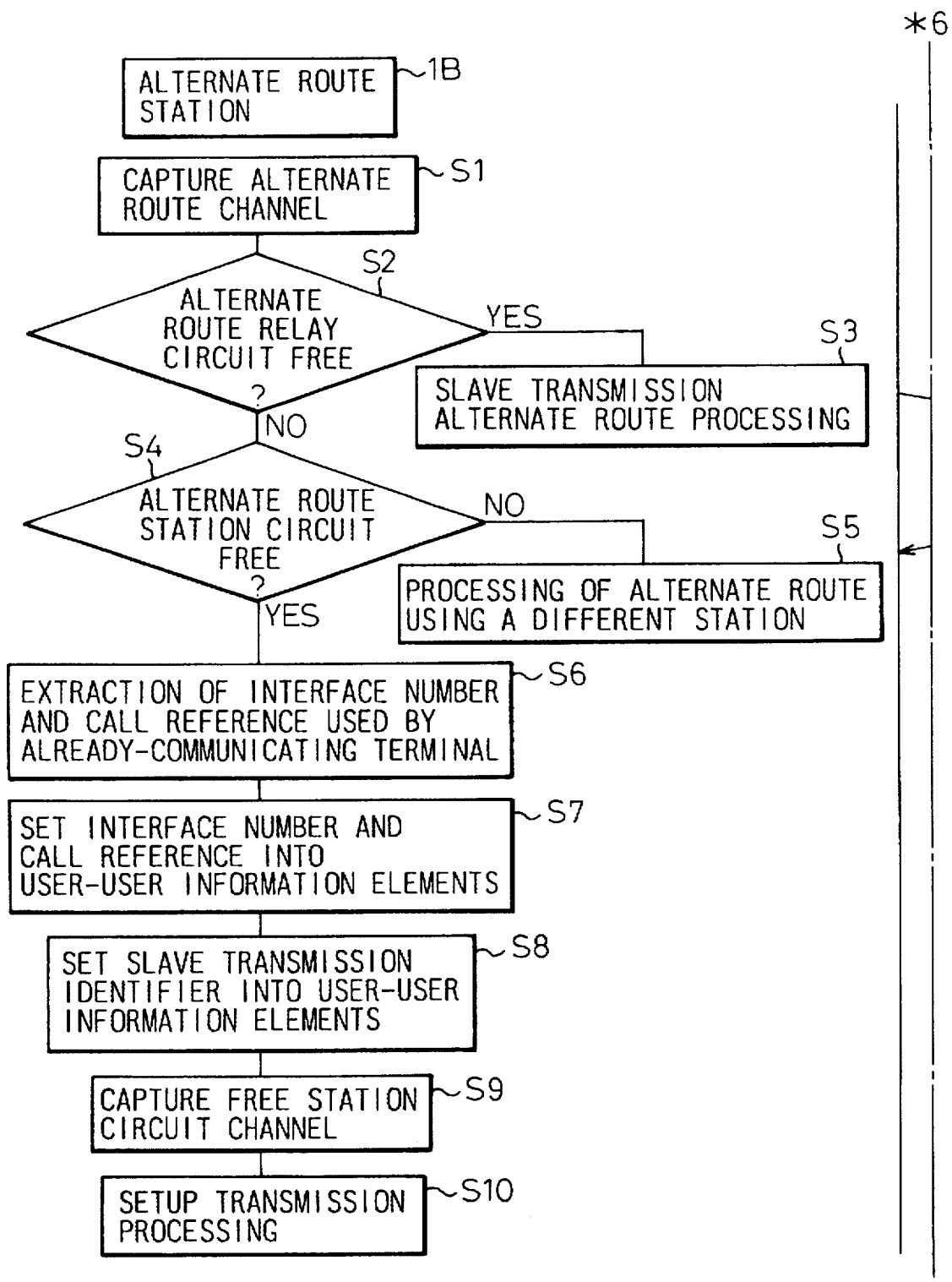
FIGS. 21A and 21B are drawings which show part (2) of a control sequence for alternate route connection in FIG. 9.
Figure 21B:
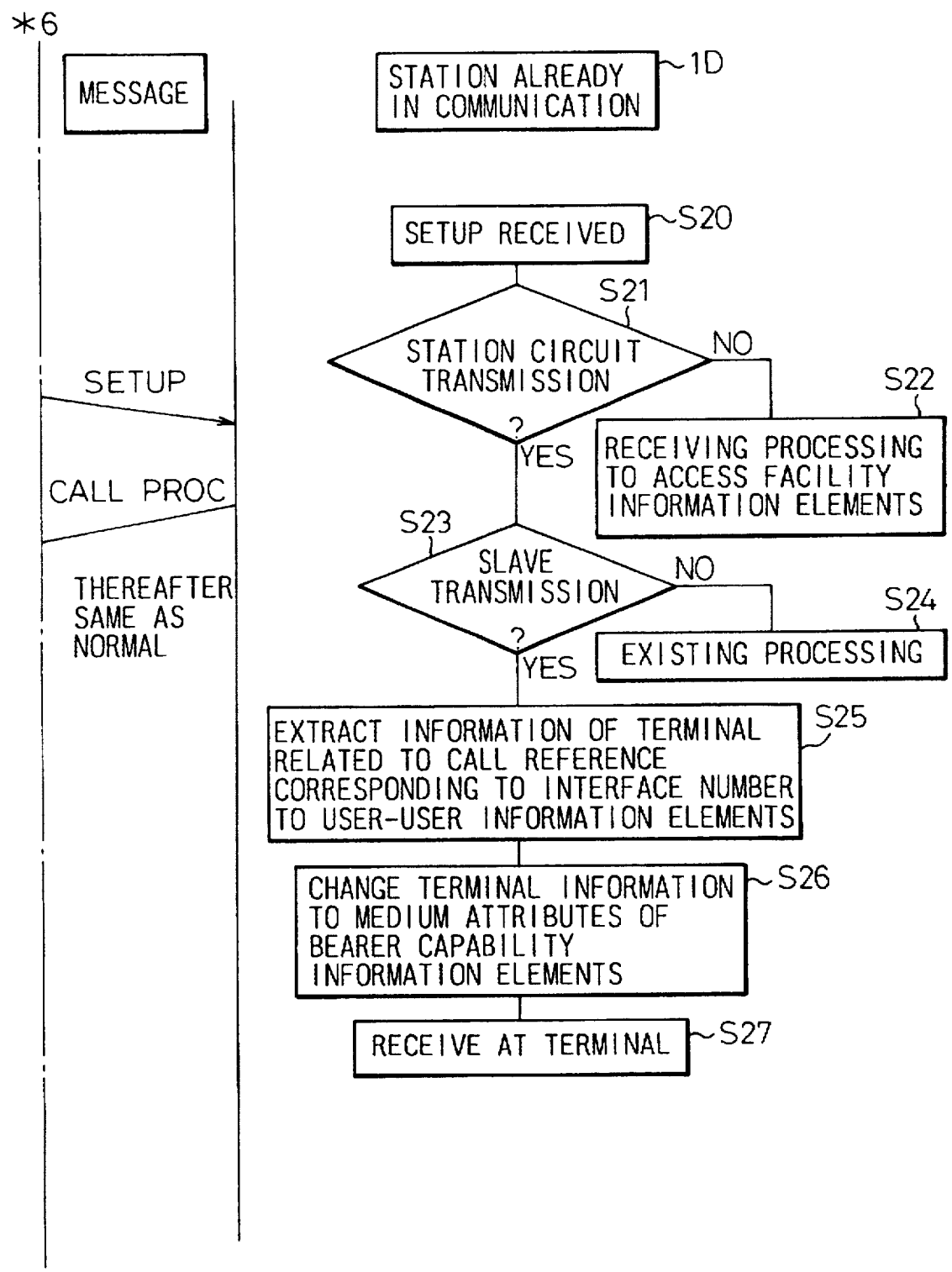

FIGS. 21A and 21B show an example of the control sequence for the case in which successive alternate connections are made to a station circuit network when all channels are in use.

The following is a description of the above-noted FIGS. 17 through 21.

FIG. 17 shows stations 1A through 1D, along with station 1E, which is a station circuit network which does not have a function that transmits and receives a slave transmission added to a SETUP message as facilities information elements, this corresponding to the station circuit network in the control flow of FIGS. 21A and 21B. If stations A through D are a private network, the station circuit network would be a public network. However, it is also possible to have both stations 1A through 1D and station 1E be different commercial communications providers.

In FIG. 17, the terminal 7 of station 1A and the terminal 8 of station 1D are communicating by means of one medium via an interface 1 at the output side of exchange 1A and the input side of transit station 1B (call reference 1), via an interface 2 at the output side of the transit station 1B and an interface 1 at the input side of station 1C (call reference 2), and via an interface 2 at the output side of the station 1C and an interface 1 at the input side of station 1D. In this condition, when a slave transmission is performed from terminal 7 and a SETUP message, to which has been added information elements that include a slave transmission identifier, is transmitted to station 1C via station 1B, if the assumption is made that all the interface number 2 and interface number 3 channels from station 1C to station 1D are free, mutual operation between each station is performed as shown in FIGS. 20A and 20B.

In FIGS. 20A and 20B, "station with all channels in use" corresponds to the station 1C in FIG. 17, and the "immediately previous station" corresponds to the station 1B shown in FIG. 17.

At station 1C, when the SETUP message is received which has information elements which include the slave transmission identifier, if all the channels on the same interface which is used to make connection to the already-communicating terminal are in use, the above-described alternate route channel capture control is performed at the channel capture control section 5a (step S1 in FIGS. 20A and 20B). When this is done, a judgment is made as to whether or not the station number is stored in the station number storage area 6b (step S2 in FIGS. 20A and 20B). If it is stored in the station number storage area 6b, a judgment is made as to whether an alternate route channel is free (step S3 in FIGS. 20A and 20B). If an alternate route channel is free, the slave transmission alternate route processing described above with regard to FIGS. 14 through 16 is performed (step S4 in FIGS. 20A and 20B). If a channel is not free, as in the case in which the station number is not stored, the slave transmission identifier is set into the facilities information elements (step S5 in FIGS. 20A and 20B), a disconnect (DISC) message 57 in which the call reference 2 of the facilities information elements of the received SETUP message is generated (step S6 in FIGS. 20A and 20B) and the above-noted DISC message 57 is sent to the immediately previous station 1B (step S7 in FIGS. 20A and 20B).

In FIGS. 20A and 20B, when the immediately previous station 1B receives this DISC message 57 (step S10 in FIGS. 20A and 20B), identification is made as to whether or not this is a slave transmission (step S11 in FIGS. 20A and 20B), and if it is not the existing processing is performed (step S12 in FIGS. 20A and 20B). If, however, it is a slave transmission, a channel for an alternate route is captured (step S13 in FIGS. 20A and 20B). In this case, the station number storage area 6b is searched using the call reference 2 of the received facilities information elements (step S14 in FIGS. 20A and 20B), and if the station in contained therein, identification of whether or not the alternate route channel is free is performed for the purpose of alternate route processing for slave transmission (step S15 in FIGS. 20A and 20B).

As a result, in the case in which a free channel exists (the case in FIG. 17 in which the interface number 3 of station 1B is free), the slave transmission alternate route processing is performed in accordance with the control flow such as shown in FIGS. 14 through 16 (step S16 in FIGS. 20A and 20B). In the case in which there is no free alternate route channel, the information elements of the received DISC message 57 are set into a transmission DISC message (step S18 in FIGS. 20A and 20B), and this is sent to the further immediately previous station 1A (step S19 in FIGS. 20A and 20B).

Next, the control flow for alternate routing of the station circuit network shown in FIGS. 21A and 21B will be described. In FIGS. 21A and 21B, the "alternate route station" corresponds to the station 1B in FIG. 17 (the same as the immediately previous station in FIGS. 20A and 20B), and the "already-communicating station" corresponds to the station 1D in FIG. 17. In the case of FIGS. 21A and 21B, in contrast to the above-noted FIGS. 20A and 20B, the station circuit network 1E is used as the alternate route.

In FIGS. 21A and 21B, when performing alternate route processing (step S16 in FIGS. 20A and 20B) by the reception of the DISC message 57 of the above-noted FIGS. 20A and 20B, or when performing a relay processing by the reception of the SETUP message, the station 1B which performs the alternate routing processing for slave transmission, if all channels in the same interface are in use and performs alternate route channel capture by means of the channel capture control section 5a (step S1 in FIGS. 21A and 21B). In this case, a judgment is made as to whether or not the relay circuit is free (step S2 in FIGS. 21A and 21B) and, if it is, slave transmission alternate route processing is performed (step S3 in FIGS. 21A and 21B). If the circuit is not free, a judgment is made as to whether or not the alternate route station circuit is free (step S4 in FIGS. 21A and 21B).

When this is done, if the station circuit is not free, alternate route processing is performed using a different station (step S5 in FIGS. 21A and 21B). If the station circuit is free, processing of the extraction of the interface number and call reference already in use for communicating from alternate route station 1B to station 1D is executed, in accordance with the control flow shown in the above-noted FIGS. 14 and 15 (step S6 in FIGS. 21A and 21B). In this case, in the example of FIG. 17 a FACILITY message is sent from station 1B to station 1D, the interface number and call reference used by terminal 8 being received from station 1D by means of a FACILITY_ACK message.

When the above-noted interface number and call reference are obtained, the above-noted interface number and call reference are set into the information elements added to the SETUP message 59 (step S7 in FIGS. 21A and 21B), the alternate route slave transmission identifier is set into the user-user information elements (step S8 in FIGS. 21A and 21B), and the station circuit free channel 9e is captured by means of the busy advance service (step S9 in FIGS. 21A and 21B). Then transmission processing is performed on the SETUP message 59 to the station circuit network 1E, with station 1D as the destination (step S10 in FIGS. 21A and 21B). The above-noted busy advance service is a service which performs alternate routing to a station circuit by a number change when all relay circuits are in use, this service being supplied by a private ISDN.

The above-noted user-user information elements are information elements in a public network ISDN used for the purpose of exchanging information between users, and in the example of FIG. 17, station 1B is one user, while the destination station 1D is the other user.

The SETUP message 59 which is sent from station 1B, which is the alternate route station, is received on the channel 9d of the station circuit of station 1D which is the destination, via the station circuit network 1E. At the station 1D, which is the already-communicating party in FIGS. 21A and 21B, when this SETUP message 59 is received (step S20 in FIGS. 21A and 21B), a judgment is performed in the message receiving control section 4c as to whether or not this is the receipt of a call on the station circuit (step S21 in FIGS. 21A and 21B), and if it is not received on the station circuit, receiving processing which access the facilities information elements accompanying the SETUP message 59 is performed (step S22 in FIGS. 21A and 21B). If it is received at the station circuit, identification is performed of whether or not this is a slave transmission, by accessing the user-user information elements accompanying the SETUP message 59 (step S23 in FIGS. 21A and 21B). If it is not a slave transmission, the existing processing is performed (step S24 in FIGS. 21A and 21B). If it is a slave transmission, however, extraction is performed, by the circuit connection control section 5b, of interface number 1, the corresponding call reference 3, and the terminal information in the terminal attribute storage area 6a for the terminal which is in a relationship of connection thereto (step S25 in FIGS. 21A and 21B), the terminal attributes in the medium attributes of the bearer capability information elements accompanying the received SETUP message 59 being changed (step S26 of FIGS. 21A and 21B) so that reception is done at terminal 8.

According to the present invention, when executing a slave transmission across networks, because it is possible to perform calling without regard to the number information of the communication destination, it is possible to execute a slave transmission without having to consider the terminal at the destination, even if the terminal at the communication destination is changed by, for example, call forwarding.

Even in the case in which all channels of the same interface as the communication destination are in use, because it is possible to perform a slave transmission by that station, an alternate route station, or by an alternate route via a station line, it is possible to perform communication which makes effective use of the network.

In addition, the various slave transmission control methods of the present invention change the processing station-to-station services of the past for use in slave transmission, a simple implementation is possible, without a great increase in cost or hardware facilities.

What is claimed is:

1. In a network formed by exchanges which support ISDN, when an exchange which receives a slave transmission request from a terminal which is already performing communication via one medium with a terminal of another station, a control method for station-to-station slave transmission, said control method comprising the steps of:

detecting said slave transmission request from said terminal and then detecting a call reference being used in a connection to said other station;

setting of a slave transmission identifier and a call reference into information elements which transfer control information and which are added to an ISDN protocol message;

capturing of a different channel on one interface used to connect to said already-communicating terminal; and sending a call setting message, into which said information elements are set, to said other station;

and further comprising, when said other station, which houses said already-communicating terminal, detects from said information elements added to a call setting message that this is a slave transmission, receiving at the other terminal connected to said other station, via medium of a type that is specified based on said call reference within said information elements.

2. A control method for station-to-station slave transmission according to claim 1 wherein, when an exchange which receives said slave transmission request or an exchange which performs relaying between said exchange and an exchange which houses said already-communicating terminal detects a slave transmission request by reception of said call setting message, said control method comprises the steps of:

setting information elements added to said received call setting message into a transmission call setting message;

changing of said call reference of information elements to the call reference of a received information element and a call reference which is in a relationship of connection; and sending to the exchange of said already-communicating terminal, via a different free channel in the same interface as used to connect to said already-communicating terminal, a call setting message.

3. A control method for station-to-station slave transmission according to either claim 1, wherein when said call setting message is sent to said exchange of said other station having said already-communicating terminal, if there is no other free channel in the same interface which connects to said already-communicating terminal, said control method further comprises the steps of:

requesting with respect to said exchange of said already-communicating terminal, for the purpose of an alternate route connection, extraction of an interface number and call reference used in connection to said already-communicating terminal;

generating and sending, to said other exchange of an alternate route, of a call setting message to which are added information elements which include said interface number, call reference, and an alternate route slave transmission identifier when notification of said interface number and call reference is made from said exchange of said already-communicating terminal;

capturing at said other alternate route exchange of an alternate route channel by means of information elements of said call setting message; and sending of said call setting message to said exchange of said already-communicating terminal; and when said alternate route slave transmission identifier is detected at said exchange of said already-communicating terminal, receiving at said corresponding other terminal, based on the interface number and call reference included in the information elements.

4. A control method for station-to-station slave transmission according to either claim 2, wherein when, among channels in the same interface used to connect to said already-communicating terminal, either there is no station number or all alternate route channels are in use, said control method further comprises the steps of:

generating a disconnect message to which are added information elements which include a slave transmission identifier and a call reference within the information elements added to a received call setting message;

sending of said disconnect message to an immediately previous station;

detecting of slave transmission, when said disconnect message is received, by means of said added information elements;

making a connection, when a station number corresponding to a call reference set in said information elements exists, via an alternate route to another exchange, in accordance with said station number;

updating the call reference in said received disconnect message, when either there is no station number or all alternate route channels are in use; and sending said disconnect message to yet a further immediately previous station.

5. A control method for station-to-station slave transmission according to either claim 2, wherein when, among channels in the same interface used to connect to said already-communicating terminal, all channels are in use and all relay circuits for alternate routing are in use and the station circuit is open, said control method further comprising the steps of:

requesting with respect to said exchange of said already-communicating terminal, extraction of an interface number and call reference used in connection to said already-communicating terminal;

adding, when notification of said interface number and call reference is made from said exchange of said already-communicating terminal, information, which includes said interface number and call reference, as user-user information to a call setting message;

sending said call setting message to a station circuit network; and using said information of said added user-user information, when said call setting message is received at said exchange of said already-communicating terminal from said station circuit, so as to receive a call in a station circuit at the already-communicating terminal.

6. In a network formed by exchanges which support ISDN, when an exchange which receives a slave transmission request from another terminal, which is already performing communication via one medium with a terminal of another station, a control method for station-to-station slave transmission, said control method comprising the steps of:

detecting said slave transmission request from said terminal and then detecting a call reference being used in a connection to said other station;

setting a slave transmission identifier and a call reference into information elements which transfer control information and which are added to an ISDN protocol message;

capturing of a different channel on one interface used to connect to said already-communicating terminal; and sending a call setting message, into which said information elements are set, to said other station.

7. A control method for station-to-station slave transmission according to claim 6, wherein when, among channels in the same interface used to connect to said already-communicating terminal, there is no free channel, said control method further comprises the steps of:

requesting with respect to said exchange of said already-communicating terminal, for the purpose of an alternate route connection, extraction of an interface number and call reference used in connection to said already-communicating terminal;

generating, when notification of said interface number and call reference is made from said exchange of said already-communicating terminal, a call setting message, to which is added information elements which include said interface number and call reference; and sending said call setting message to a different exchange of an alternate route.

8. A control method for station-to-station slave transmission according to claim 7, wherein, when said alternate route connection is made, a request, made to said exchange of said already-communicating terminal for extraction of an interface number and call reference used in connection to said already-communicating terminal, is sent by means of an ISDN protocol FACILITY message via a D channel which is already being used in communication.

9. In a network formed by exchanges which support ISDN, when an exchange of an already-communicating terminal which receives a slave transmission request from another terminal which is already performing communication via one medium with a terminal of another station, a control method for station-to-station slave transmission, said control method comprising the steps of:

detecting, from information elements which had been added to said call setting message, that this is a slave transmission, and receiving at the other terminal via a medium of a type that is specified based on a call reference within the said information elements.

10. A control method for station-to-station slave transmission according to claim 9, wherein when call receiving is done at an already-communicating terminal by means of a call setting message, a memory of the exchange is searched, by means of a call reference including in the said received call setting message, for terminal information of a connected terminal, said terminal information being changed to the medium information in bearer capability information elements accompanying the call setting message for reception.

11. A control method for station-to-station slave transmission according to claim 9, wherein when a request for extraction of an interface number and call reference used for connection to an already-communicating terminal is made from said already-communicating terminal of said other station to said already-communicating terminal, notification is made of the said requested interface number.

12. A control method for station-to-station slave transmission according to claim 11, wherein when said exchange of said already-communicating terminal extracts an interface number and a call reference used in connection to said already-communicating terminal, notification is made by using an ISDN protocol FACILITY_ACK message.

13. In a network formed by exchanges which support ISDN, when an exchange which performs relaying between an exchange which receives a slave transmission request from a connected terminal and an exchange which houses an already-communicating terminal of another station, a control method for station-to-station slave transmission, said control method comprising the steps of:

detecting that this is a slave transmission by receiving a call setting message from said exchange which receives said slave transmission request;

setting information elements which are added to the said received call setting message into a transmission call setting message;

changing the call reference of said information elements to the call reference and connected call reference of said received information elements; and sending a call setting message to said exchange having said already-communicating terminal, via a different free channel in the same interface which is used to connect to the already-communicating terminal.

14. A control method for station-to-station slave transmission according to claim 13, wherein when, among channels in the same interface used to connect to said already-communicating terminal there is no free channel, said control method further comprises the steps of:

requesting with respect to said exchange of said already-communicating terminal, for the purpose of an alternate route connection, extraction of an interface number and call reference used in connection to said already-communicating terminal;

generating, when notification of said interface number and call reference is made from said exchange of said already-communicating terminal, a call setting message, to which is added information elements which include said interface number and alternate route slave transmission identifier; and sending said call setting message to a different exchange of an alternate route.

15. A control method for station-to-station slave transmission according to claim 14, wherein a request made to said exchange of said already-communicating terminal for extraction of an interface number and call reference used in connection to said already-communicating terminal is sent by means of an ISDN protocol FACILITY message via a D channel which is already being used in communication.

16. A control method for station-to-station slave transmission according to claim 13, wherein when, among channels in the same interface used to connect to said already-communicating terminal, either there is no station number or all alternate route channels are in use, said control method further comprises the steps:

generating a disconnect message to which are added information elements which include a slave transmission identifier and a call reference within the information elements added to a received call setting message;

sending of said disconnect message to an immediately previous station;

detecting a slave transmission, when said disconnect message is received, from said added information elements;

making a connection, when a station number corresponding to a call reference set in said information elements exists, via an alternate route to another exchange, in accordance with said station number;

updating the call reference in said received disconnect message, when either there is no station number or all alternate route channels are in use; and sending said disconnect message to yet a further immediately previous station.

17. In a network formed by exchanges which support ISDN, a method of control for station-to-station slave transmission, wherein, when a call setting message either is received from an exchange which receives a request for slave transmission from a terminal connected therewithin or is received from an exchange which performs relaying between said exchange and an exchange which houses an already-communicating terminal of a different station, said call setting message having added to it information elements which include an interface number and call reference which is used to make connection to said already-communicating terminal, an exchange on a different alternate route which receives said call setting message captures an alternate route channel by means of information elements of said call setting message and sends said call setting message to said exchange of said already-communicating terminal.

18. An exchange in a network, in which one exchange establishes a new communication call between one terminal accommodated with the one exchange and an other terminal which is accommodated with an other exchange and already establishing a communication call to the one terminal via the network, when the one terminal originates a slave transmission request to the one exchange, the exchange comprising:

detecting means for detecting the slave transmission request from the one terminal; and control means for setting identification information indicating the slave transmission request together with communication call identification information identifying the communication call between the one terminal and the other terminal to a call setting message, and sending the call setting message to the other exchange.

19. The exchange according to claim 18, further comprising means for capturing a free channel for communicating with the another terminal side.

20. An exchange in a network, in which one exchange establishes a new communication call between one terminal accommodated with the one exchange and an other terminal which is accommodated with an other exchange and already establishing a communication call to the one terminal via the network, when the one terminal originates a slave transmission request to the one exchange, the exchange comprising:

detecting means for detecting identification information indicating the slave transmission request and communication call identification information identifying the communication call between the one terminal and the other terminal by a call setting message received from the one exchange; and control means for establishing a new communication call to a terminal on the another terminal side on the basis of the communication call identified by the communication call identification information.

21. The exchange according to claim 20, the control means further having means for establishing the new communication call to a type of medium different from that of the communication call identified by the communication call identification information.

22. An exchange in a network, in which one exchange establishes a new communication call between one terminal accommodated with the one exchange and an other terminal which is accommodated with an other exchange and already establishing a communication call to the one terminal via the network, when the one terminal originates a slave transmission request to the one exchange, the exchange comprising:

detecting means for detecting identification information indicating the slave transmission request and communication call identification information identifying the communication call between the one terminal and the other terminal by a call setting message received from the one exchange;

changing means for changing the received communication call identified by the communication call identification information to a new communication call for relaying between the one terminal and the other terminal; and control means for setting identification information indicating the slave transmission request together with communication call identification information identifying the new communication call to a call setting message, and sending the call setting message to the other exchange.

23. The exchange according to claim 22, further comprising means for capturing a free channel for communication with the another terminal side.

* * * * *